United States Patent
Denning et al.

(10) Patent No.: US 11,899,445 B2
(45) Date of Patent: Feb. 13, 2024

(54) HIGH AVAILABILITY REDUNDANT POWER DISTRIBUTION SYSTEMS AND METHODS

(71) Applicant: Rockwell Automation Technologies, Inc., Mayfield Heights, OH (US)

(72) Inventors: Stephen E. Denning, Silver Lake, OH (US); Sean P. Overberger, Painesville, OH (US); James R. Hissem, Granger Township, OH (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 88 days.

(21) Appl. No.: 17/485,830

(22) Filed: Sep. 27, 2021

(65) Prior Publication Data

US 2023/0101570 A1     Mar. 30, 2023

(51) Int. Cl.
| | |
|---|---|
| *G05B 9/03* | (2006.01) |
| *G05B 13/02* | (2006.01) |
| *H02H 3/08* | (2006.01) |
| *H02H 7/10* | (2006.01) |

(52) U.S. Cl.
CPC ............ *G05B 9/03* (2013.01); *G05B 13/024* (2013.01); *H02H 3/081* (2013.01); *H02H 7/10* (2013.01)

(58) Field of Classification Search
CPC . H02H 3/081; H02H 7/10; H02J 1/102; H02J 1/108; G05B 9/03; G05B 13/024
USPC .......................................................... 307/24
See application file for complete search history.

(56) References Cited

U.S. PATENT DOCUMENTS

| | | | |
|---|---|---|---|
| 4,520,416 A | 5/1985 | Karash | |
| 5,036,452 A * | 7/1991 | Loftus | ..................... H02J 1/102 363/21.04 |
| 6,411,119 B1 | 6/2002 | Feldtkeller | |
| 7,652,393 B2 | 1/2010 | Moth | |
| 8,772,964 B2 | 7/2014 | Beg et al. | |
| 9,093,860 B2 | 7/2015 | Beg | |
| 9,172,271 B2 | 10/2015 | Beg et al. | |
| 9,594,097 B2 | 3/2017 | Bogner et al. | |
| 9,735,692 B1 | 8/2017 | Lu et al. | |

(Continued)

FOREIGN PATENT DOCUMENTS

| | | |
|---|---|---|
| CN | 110879565 A | 3/2020 |
| DE | 19814097 C1 | 3/2000 |

(Continued)

OTHER PUBLICATIONS

U.S. Appl. No. 17/485,849, filed Sep. 27, 2021, Stephen E. Denning.

(Continued)

*Primary Examiner* — Kevin J Comber
(74) *Attorney, Agent, or Firm* — Fletcher Yoder, P.C.

(57) ABSTRACT

Embodiments of this present disclosure may include a system with a first power converter and a control system. The first power converter may supply a first output power to a first backplane at least sometimes concurrent to a second power converter supplying a second output power to a second backplane. The control system may be electrically coupled to the first backplane and the second backplane. The control system may balance a first electrical property and a second electrical property provided to each of one or more load components electrically coupled to the first backplane and the second backplane.

20 Claims, 10 Drawing Sheets

(56) References Cited

U.S. PATENT DOCUMENTS

| | | |
|---|---|---|
| 10,082,856 B1 | 9/2018 | Owen et al. |
| 10,631,426 B1 | 4/2020 | Lostoski et al. |
| 10,684,611 B2 | 6/2020 | O'Connell et al. |
| 10,838,386 B1 | 11/2020 | Wrobel et al. |
| 10,985,477 B1 | 4/2021 | Wrobel et al. |
| 10,986,748 B1 | 4/2021 | Wrobel et al. |
| 2003/0204777 A1 | 10/2003 | Kojori |
| 2009/0267582 A1 | 10/2009 | Prodic et al. |
| 2010/0007216 A1 | 1/2010 | Chojecki et al. |
| 2011/0184579 A1* | 7/2011 | Nilsen .................... G06F 1/324 307/9.1 |
| 2012/0098338 A1 | 4/2012 | Lew et al. |
| 2013/0138365 A1 | 5/2013 | Etaati et al. |
| 2015/0331468 A1 | 11/2015 | Jau et al. |
| 2018/0052503 A1 | 2/2018 | Sharma et al. |
| 2018/0252777 A1 | 9/2018 | Straub |
| 2018/0292801 A1 | 10/2018 | Tonet |
| 2018/0351547 A1 | 12/2018 | Chawla |
| 2019/0366953 A1 | 12/2019 | Ganireddy et al. |
| 2020/0303922 A1 | 9/2020 | Fukuhara et al. |
| 2021/0148968 A1 | 5/2021 | Wells et al. |
| 2023/0015527 A1* | 1/2023 | Zipf .................... H02J 7/0063 |

FOREIGN PATENT DOCUMENTS

| | | |
|---|---|---|
| DE | 102004034451 A1 | 2/2006 |
| EP | 0985987 A2 | 3/2000 |
| EP | 3798769 A1 | 3/2021 |
| GB | 2567650 B | 4/2019 |
| JP | H06120787 A | 4/1994 |
| JP | 2017050933 A | 3/2017 |

OTHER PUBLICATIONS

U.S. Appl. No. 17/410,659, filed Aug. 24, 2021, John R. O'Connell.

Extended European Search Report for Application No. 22189913.1 dated Feb. 20, 2023, 8 pages.

Patoka, M., "Fundamentals of power system ORing," EETimes, https://www.eetimes.com/fundamentals-of-power-system-oring/, published Mar. 21, 2007, 6 pages.

Extended European Search Report for Application No. 22198001.4 dated Feb. 21, 2023, 10 pages.

Extended European Search Report for Application No. 22198006.3 dated Feb. 10, 2023, 12 pages.

Extended European Search Report for Application No. 22205345.6 dated Apr. 5, 2023, 10 pages.

\* cited by examiner

HIGH AVAILABILITY REDUNDANT POWER DISTRIBUTION SYSTEMS AND METHODS

BACKGROUND

This disclosure generally relates to industrial automation systems and, more particularly, to power distribution systems and methods to supply industrial control devices, such as a distributed modular input/output (IO) device (e.g., IO module) with configurable single-channel IO submodules.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as admissions of prior art.

Industrial automation systems may include automation control and monitoring systems. The automation control and monitoring systems may monitor and/or receive status information and/or sensing data from a wide range of devices, such as valves, electric motors, various types of sensors, other suitable monitoring devices, or the like. In addition, one or more components of the automation control and monitoring systems, such as programming terminals, automation controllers, input/output (IO) modules, communication networks, human-machine interface (HMI) terminals, and the like, may use the statuses and/or collected information to provide alerts to operators to change or adjust an operation of one or more components of the industrial automation system (e.g., such as adjusting operation of one or more actuators), to manage the industrial automation system, or the like.

Availability of the industrial automation system may be stated in terms of the availability of the service it provides to operators or owners. It may not be acceptable to have a portion of the industrial automation system be offline while a repair occurs. Nor may it be acceptable to have a portion of the industrial automation system down while planned maintenance or upgrades are performed. An example minimum level of availability for petrochemical applications may be "five-nines," or service availability 99.999% percent of the time. This means that the industrial automation system can be down for a maximum of about 5 minutes a year. Five-nines may be found in customer specifications that define industrial automation system target operations, such as a target high availability for process control systems and/or safety instrumented systems to implement. The industrial automation system may include a number of critical subsystems, which may be expected to achieve a much higher level of availability to meet the target availability. However, the availability should be balanced with reliability. For example, an industrial automation system may be highly available (e.g., because the system is repairable) and not be very reliable due to occurrence of undetected operations that cause the industrial automation system to go fully or partially offline. Thus, industrial automation systems and methods that promote high availability and improve system reliability may be desired.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system may include a first power converter that supplies a first output power to a first backplane and a second power converter that supplies a second output power to a second backplane. The first backplane and the second backplane may be electrically coupled to one or more load components that operate based on the first output power, the second output power, or both. The first backplane and the second backplane may also be electrically coupled to a control system. The control system may receive a first indication of the first output power and may receive a second indication of a second output power. The control system may determine a difference between the first output power and the second output power and may determine that the difference is greater than or equal to a threshold amount of power. In response to the difference being greater than or equal to the threshold amount of power, the control system may send one or more control signals to the first power converter, the second power converter, or both to adjust the first output power, the second output power, or both based on the difference.

In another embodiment, a system may include a first power converter and a control system. The first power converter may supply a first output power to a first backplane at least sometimes concurrent to a second power converter supplying a second output power to a second backplane. The control system may be electrically coupled to the first backplane and the second backplane. The control system may balance a first power output and a second power output provided to each of one or more load components electrically coupled to the first backplane and the second backplane.

In yet another embodiment, a method may include receiving, via a power conditioner control system electrically coupled to a first backplane and a second backplane, a first indication of a first output power, where a first power converter supplies the first backplane with the first output power. The method may include receiving, via the power conditioner control system, a second indication of a second output power, where a second power converter supplies the second backplane electrically coupled to the power conditioner control system with the second output power. The method may include determining, via the power conditioner control system, a difference between the first output power and the second output power and determining, via the power conditioner control system, that the difference is greater than or equal to a threshold amount of power. The method may also include, in response to the difference being greater than or equal to the threshold amount of power, sending, via the power conditioner control system, one or more control signals to the first power converter, the second power converter, or both to adjust the first output power, the second output power, or both based on the difference.

BRIEF DESCRIPTION OF THE DRAWINGS

These and other features, aspects, and advantages of the present disclosure may become better understood when the following detailed description is read with reference to the accompanying drawings in which like characters represent like parts throughout the drawings, wherein.

DETAILED DESCRIPTION

Figure 1:
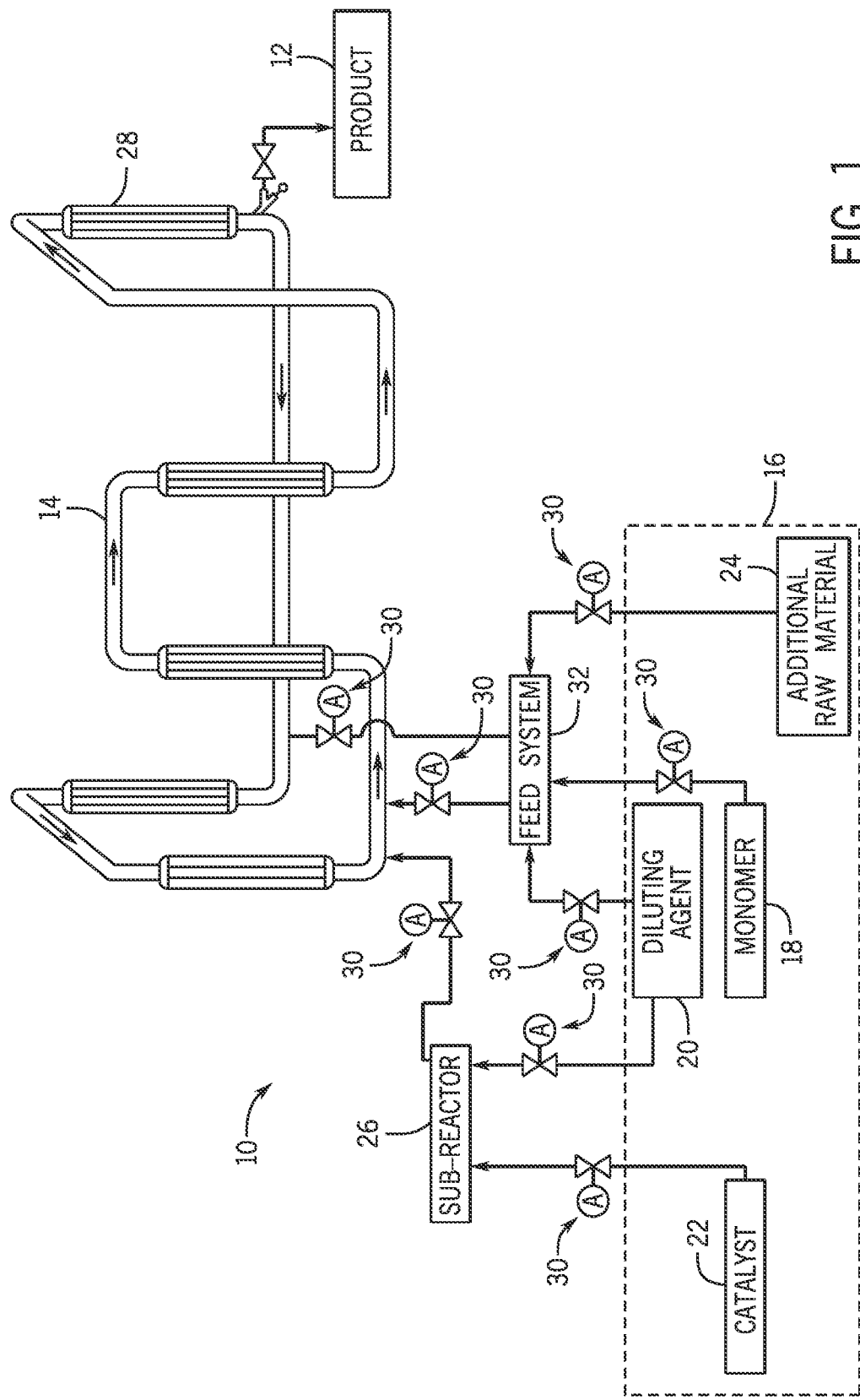
FIG. 1 is a diagrammatic representation of an example petrochemical-related process, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions are made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure is generally directed towards industrial automation-related systems and methods that use redundant, concurrently operating power supplies to feed multiple, adjustable backplane power rails that supply downstream devices with power. Use of concurrent and redundant power supplies may provide the industrial automation system with an increased capability to respond to changes in component-level operations and electrical faults, which may result in improved reliability and higher system availabilities. High availability may be manifested as, for example, a high mean time to failure (MTTF) combined with a low mean time to repair (MTTR).

To elaborate, redundant power supplies may power two or more power conditioners. Each power conditioner may supply respective amounts of power to different backplanes that distribute the power to a shared load, such as one or more input/output (IO) modules. A load may couple to at least two backplanes via power ORing circuitry. For example, a secondary power conditioner may back up a primary power conditioner, such that the secondary power conditioner and the primary power conditioner may concurrently supply the shared load. Since the power conditioners provide voltage to the shared load at the same time, if the primary power supply and/or primary power conditioner were to go offline, then the load may be switched to being powered by the secondary power conditioner without causing interruption to operation of the load. Indeed, if the primary power supply and/or the primary power conditioner become unavailable, the secondary power supply and the secondary power conditioner become the power source of the load.

When coupled to the backplanes via power ORing circuitry, the load may lose power when both power supplies and power conditioners are unavailable but may remain powered on if the primary power supply and/or the primary power conditioner is lost. Consequently, common cause misoperation may occur less since there is less opportunity for a single fault to make both power supplies unavailable during distribution to the load when power ORing occurs at the load. Furthermore, since the secondary power supply provides power to the load concurrently with the primary power supply, even if the primary power supply were to become unavailable, the load would not have to be switched to the secondary power supply to receive power. Thus, the load may experience fewer signal transient noises than typically introduced during the switching process. Additional redundancy systems are also described herein to further improve industrial automation reliability and availability, which may further reduce a likelihood of the load going offline.

Although redundant power conditioners may improve operation, it may be difficult or undesirable to perform physical tests on redundant power conditioners concurrently providing power to the same load to test the outputs. Since both of the power conditioners continuously provide the same voltage amount to the shared load, the load may be seamlessly switched between the primary power supply and secondary power supply without causing any interruption. This may also make it difficult or undesirable to take either power supply offline for validation testing. Indeed, taking one power supply offline compromises availability since the remaining power supply may fail while the other is offline.

To remedy this, systems and methods described herein relate to online validation testing that do not disrupt concurrent power supply operations. To verify that a primary power conditioner is capable of supplying a full load current to a load, a primary power conditioner may adjust (e.g., increase, decrease) its voltage output provided to the load, such that the load may be fully supplied by the primary power conditioner, thereby confirming that the primary power conditioner is capable of supplying the full load in the event of the secondary power conditioner being unavailable, such as during a future normal operation.

Independent operation of different portions of the industrial automation system, including the power distribution system, may enhance diagnostic capabilities of the industrial automation system. System-wide diagnostic operations may be performed based on the monitored operation of the different individual IO modules (e.g., loads) of the industrial automation system. The power ORing circuitry may also include sensing circuitry to obtain measurements of current, voltage, temperature, or any metric, of portions of the power conditioners, of the load, or the like for diagnostic operations. The measurements may enhance in-field control determinations. For example, a local control system of one device may adjust its operation based on a measurement made in another device without intervention of a system-wide control system. Health monitoring provided by the diagnostic capabilities may enable detection of backplane, power conditioner, and/or power supply inability to support a full load in the event that one of the power supplies is unavailable. Health monitoring at the IO module level (e.g., load module level) may also enable detection of a load module that unable to support its own load in the event of the failure of one of the power rails.

Although the following example environment in which the present embodiments may be implemented is described in terms of a petrochemical application, it should be understood that concurrent and redundant power supplying and distribution systems may also improve operations in other applications. For example, burner management applications, gas production applications, mining applications, and/or other heavy industrial applications may benefit from power ORing circuitry embodiments described herein, as well as any systems in which improved reliability and efficiency (e.g., less down time) is desired.

By way of introduction, FIG. 1 is a diagrammatic representation of a petrochemical-related process in which embodiments described below may be implemented. In particular, illustrated is an example reactor system 10, such as a polymerization reactor capable of processing olefin monomers, like ethylene or hexene, to produce homopolymers or co-polymers as products 12. Any suitable reactor may be used, including batch, slurry, gas-phase, solution, high pressure, tubular or autoclave reactors, or any combination thereof. For ease of discussion, FIG. 1 refers to a loop reactor 14 for polymerization. However, it should be noted that the discussion set forth below is intended to be applicable, as appropriate, to any petrochemical process, industrial process, manufacturing process, or the like, as a way to provide context to the following discussion of FIGS. 2-9.

Production processes, like the polymerization reactor process shown in FIG. 1, may occur on an ongoing basis as part of a continuous operation to generate products (e.g., product 12). Sometimes a variety of both continuous and batch systems may be employed throughout a production process. Various suppliers may provide reactor feedstocks 16 to the reactor system 10 via pipelines, trucks, cylinders, drums, and so forth. The suppliers may include off-site and/or on-site facilities, including olefin plants, refineries, catalyst plants, on or off-site laboratories, and the like. Examples of possible feedstocks 16 include olefin monomers 18, diluents or diluting agents 20, catalysts 22, and/or other additives. The other feed components, additional raw materials 24, may also be provided to the reactor 14. Feedstocks 16 may change when using different manufacturing processes and/or when manufacturing a different final product. The feedstocks 16 may be stored or processed in any suitable vessel or process, such as in monomer storage and feed tanks, diluent vessels, catalyst tanks, co-catalyst cylinders and tanks, treatment beds like molecular sieve beds and/or aluminum packing, and so forth, prior to or after being received at the reactor system 10. The reactor system 10 may include one type of reactor in a system or multiple reactors of the same or different type, and desired processing conditions in one of the reactors may be different from the operating conditions of the other reactors.

The product 12 may be moved from the reactor system 10 for additional processing, such as to form polymer pellets from the product 12. In general, the product 12, or processed product (e.g., pellets) may be transported to a product load-out area for storage, blending with other products or processed products, and/or loading into railcars, trucks, bags, ships, and so forth, for distribution to customers.

Processes, like the reactor system 10, may receive or process feedstocks 16 at relatively high pressures and/or relatively high temperatures. For example, a hydrogen feedstock may be handled by the reactor system 10 via pipeline at approximately 900-1000 pounds per square inch gauge (psig) at psig at 90-110° F. Furthermore, some products may be generated using highly reactive, unstable, corrosive, or otherwise toxic materials as the feedstock 16 or as intermediate products, such as hydrogen sulfide, pure oxygen, or the like. Heat, pressure, and other operating parameters may be employed appropriately to obtain appropriate reaction conditions, which may increase a reactivity, instability, or corrosive nature of the feedstock 16. These materials may be desired to be processed and transported using reliable and highly available systems, for example, to reduce a likelihood of a release event from occurring.

Each of the feedstocks 16, sub-reactor 26, and/or feed system 32 may use different operating parameters to create suitable output intermediate products for use in subsequent reactions or as a product output. Operating parameters of the reactor system 10 may include temperature, pressure, flow rate, mechanical agitation, product takeoff, component concentrations, polymer production rate, and so forth, and one or more may be selected on to achieve the desired polymer properties. Controlling temperature may include using a gas burner, an electrical heating conduit, a heat exchange device 28, or the like, to increase or reduce the temperature of intermediate products of the reactor system 10. As an example, during operation, a cooling fluid may be circulated within the cooling jackets of the heat exchange devices 68 as needed to remove the generated heat and to maintain the temperature within the desired range, such as between approximately 150° F. to 250° F. (65° C. to 121° C.) for polyethylene.

Figure 2:
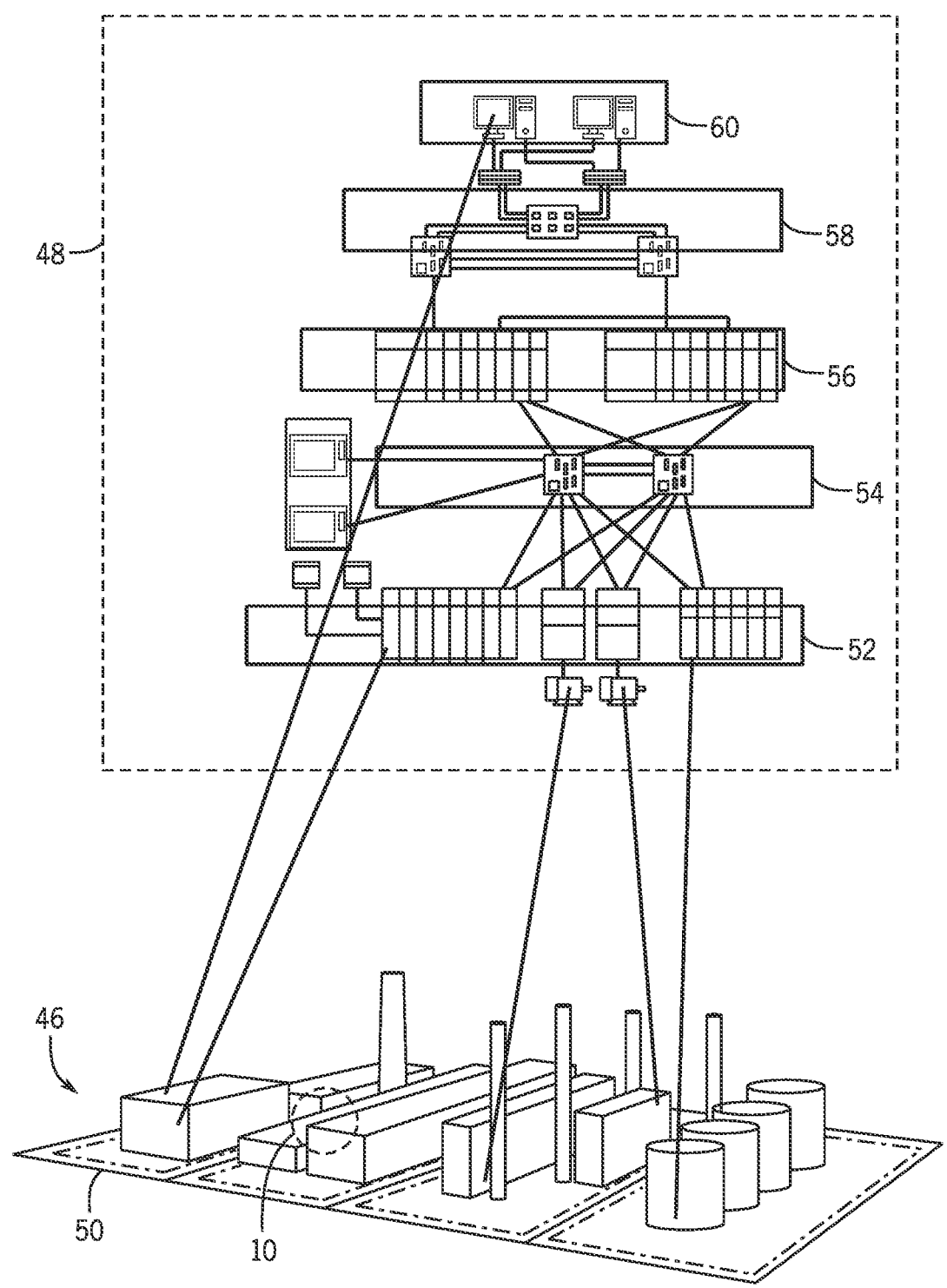
FIG. 2 is an illustration of an industrial automation system that includes a distributed control system (DCS), in accordance with an embodiment.

Feedstock 16 flow rates, control of operating parameters, and the like, may be managed by a control system (e.g., like the control system shown in FIG. 2). The control system may generate control signals, for example, control signals that are transmitted to one or more actuators 30 to cause the actuator to open or close (or partially open or partially close) as a way to control operating parameters of the feedstock 16, control of other operating parameters, and the like. Care may be taken when adjusting operating parameters since petrochemical manufacturing processing may be highly sensitive to erroneous operation. For example, fractions of a percentage of reliability change in a control system of the reactor system 10 may make a difference between a process being taken offline or a process working as expected.

With the foregoing in mind, the components of the reactor system 10 may be connected to power supplies, power supply conditions, and other systems that enable the components to be highly available. Moreover, it should be noted that the present embodiments described herein may be implemented in a variety of industrial environments and should not be limited to the reactor system 10 described above.

Referring now to FIG. 2, FIG. 2 is an illustration of an example industrial automation system 46 that includes a distributed control system 48 (e.g., a "DCS"). The industrial automation system 46 may include the reactor system 10 from FIG. 1 and/or any number of industrial automation components.

Industrial automation components may include a user interface, the distributed control system 48, a motor drive, a motor, a conveyor, specialized original equipment manufacturer machines, fire suppressant system, and any other device that may enable production or manufacture products or process certain materials. In addition to the aforementioned types of industrial automation components, the industrial automation components may also include controllers, input/output (IO) modules, motor control centers, motors, human-machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged), and the like. The industrial automation components may also be related to various industrial equipment such as mixers, machine conveyors, tanks, skids, specialized original equipment manufacturer machines, and the like. The industrial automation components may also be associated with devices used in conjunction with the equipment such as scanners, gauges, valves, and the like. In one embodiment, every aspect of the industrial automation component may be controlled or operated by a single controller (e.g., control system). In another embodiment, the control and operation of each aspect of the industrial automation components may be distributed via multiple controllers (e.g., control system).

The industrial automation system 46 may divide logically and physically into different units 50 corresponding to cells, areas, factories, subsystems, or the like of the industrial automation system 46. The industrial automation components (e.g., load components, processing components) may be used within a unit 50 to perform various operations for the unit 50. The industrial automation components may be logically and/or physically divided into the units 50 as well to control performance of the various operations for the unit 50.

The distributed control system 48 may include computing devices with communication abilities, processing abilities, and the like. For example, the distributed control system 48 may include processing modules, a control system, a programmable logic controller (PLC), a programmable automation controller (PAC), or any other controller that may monitor, control, and operate an industrial automation device or component. The distributed control system 48 may be incorporated into any physical device (e.g., the industrial automation components) or may be implemented as a stand-alone computing device (e.g., general purpose computer), such as a desktop computer, a laptop computer, a tablet computer, a mobile device computing device, or the like. For example, the distributed control system 48 may include many processing devices logically arranged in a hierarchy to implement control operations by disseminating control signals, monitoring operations of the industrial automation system 46, logging data as part of historical tracking operations, and so on.

In an example distributed control system 48, different hierarchical levels of devices may correspond to different operations. A first level 52 may include input/output communication modules (IO modules) to interface with industrial automation components in the unit 50. A second level 54 may include control systems that control components of the first level and/or enable intercommunication between components of the first level 52, even if not communicatively coupled in the first level 52. A third level 56 may include network components, such as network switches, that support availability of a mode of electronic communication between industrial automation components. A fourth level 58 may include server components, such as application servers, data servers, human-machine interface servers, or the like. The server components may store data as part of these servers that enable industrial automation operations to be monitored and adjusted over time. A fifth level 60 may include computing devices, such as virtual computing devices operated from a server to enable human-machine interaction via an HMI presented via a computing device. It should be understood that levels of the hierarchy are not exhaustive and nonexclusive, and thus devices described in any of the levels may be included in any of the other levels. For example, any of the levels may include some variation of an HMI.

One or more of the levels or components of the distributed control system 48 may use and/or include one or more processing components, including microprocessors (e.g., field programmable gate arrays, digital signal processors, application specific instruction set processors, programmable logic devices, programmable logic controllers), tangible, non-transitory, machine-readable media (e.g., memory such as non-volatile memory, random access memory (RAM), read-only memory (ROM), and so forth. The machine-readable media may collectively store one or more sets of instructions (e.g., algorithms) in computer-readable code form, and may be grouped into applications depending on the type of control performed by the distributed control system 48. In this way, the distributed control system 48 may be application-specific, or general purpose.

Furthermore, portions of the distributed control system 48 may be a or a part of a closed loop control system (e.g., does not use feedback for control), an open loop control system (e.g., uses feedback for control), or may include a combination of both open and closed system components and/or algorithms. Further, in some embodiments, the distributed control system 48 may utilize feed forward inputs. For example, depending on information relating to the feedstocks 16 (e.g., compositional information relating to the catalyst 22 and/or the additional raw material 24, the distributed control system 48 may control the flow of any one or a combination of the feedstocks 16 into the sub-reactor 26, the reactor 14, or the like.

Each of the levels 52, 54, 56, 58, 60 may include component redundancies, which may help provide a high availability control system. For example, within the first level, redundant and concurrently operating backplanes may provide power to each of the IO modules.

Figure 3:
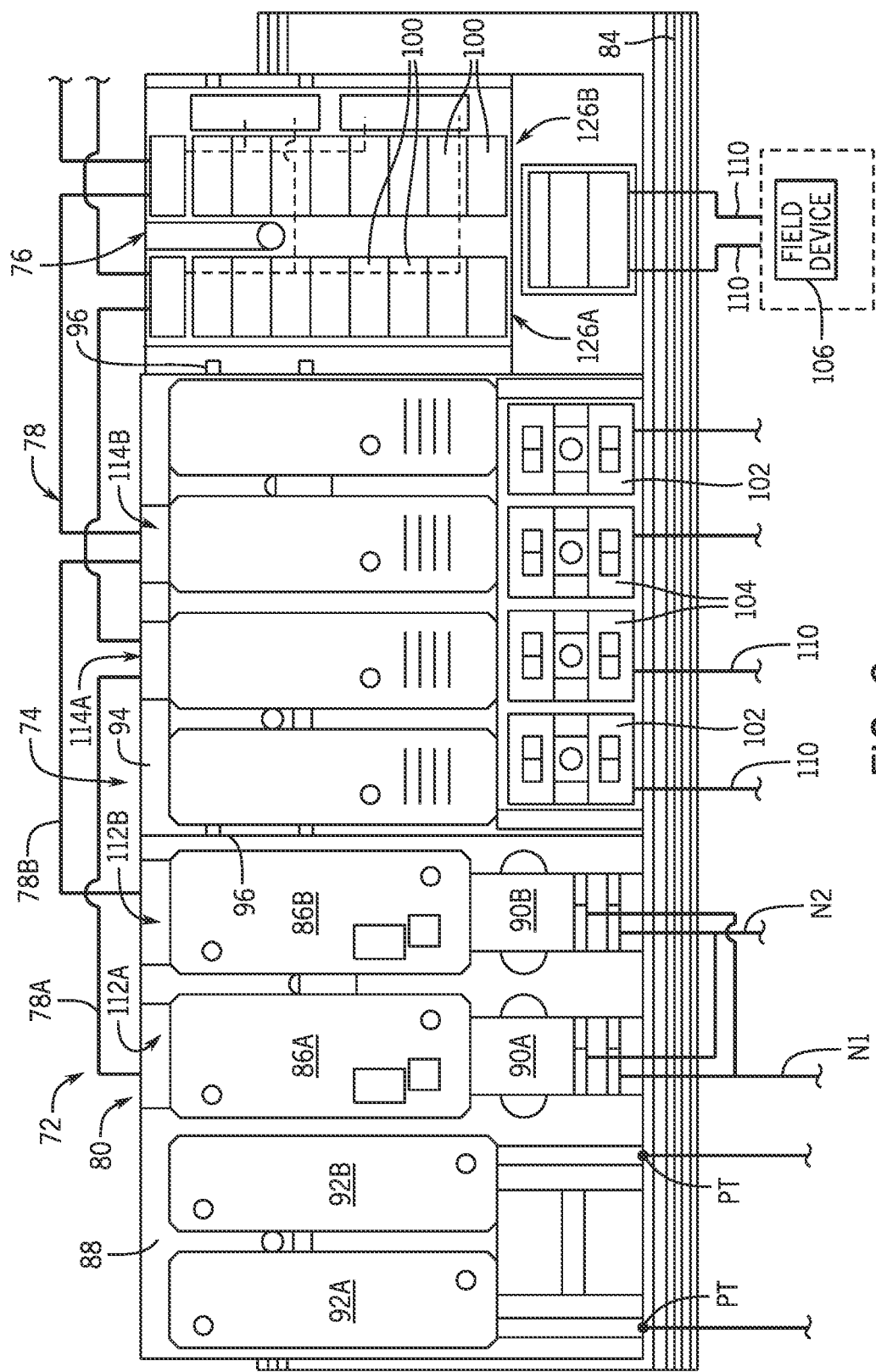
FIG. 3 is an illustration of a distributed modular input/output (IO) system, in accordance with an embodiment.

To elaborate, FIG. 3 is an illustration of a distributed modular IO system 72 associated with the distributed control system 48 of FIG. 2. The distributed modular IO system 72 may include IO devices 74, an IO module 76 and backplanes 78 (78A, 78B). The distributed modular IO system 72 may include a network adapter 80 having two or more adapter modules 86 (86A, 86B).

The network adapter 80 may be coupled to at least one industrial automation network N1, N2. The first and second redundant industrial automation networks N1, N2 may be Parallel Redundancy Protocol (PRP) LAN networks, Ethernet/IP networks, or other industrial automation networks so that the network adapter 80 may receive data from, transmits data to, and otherwise communicates with one or more industrial control modules, control systems, processing circuitry, or the like, such as one or more programmable logic controllers (PLC), microprocessors, and/or other electronic processors for machine and/or process control.

The network adapter 80 may include a base 82 mounted to the support rail 84 or other support structure. The network adapter 80 may include first and second identical or otherwise redundant adapter modules 86 (86A, 86B) operating in parallel with each other. The redundant adapter modules 86 may each be releasably connected to the adapter base 88. Each of the adapter modules 86 may be operably connected to both the first and second networks N1, N2 by connections in the adapter base 88. The adapter modules 86 may also include electronic circuitry to communicate data with circuitry coupled to the networks N1, N2, with IO devices 74, or with other interconnected components.

The network adapter 80 may include first and second media landing modules 90 (90A, 90B) removably coupled to the first and second adapter modules 86 through the adapter base 88. The media landing boards 90 may each include at least two network connectors NC, such as RJ45 connectors, Small FormFactor Pluggable (SFP) connectors, optical fiber connectors, or the like. The industrial networks N1, N2 may be coupled to the media landing boards 90 via the network connectors NC, and thus be connected to the adapter modules 86 though the media landing boards 90.

The IO device 74 redundant power conditioning and supplying IO modules (power conditioners) 92 (92A, 92B), which may be coupled to the adapter base 88 and may include a power input terminal PT. The power input terminal PT may be used when connecting with at least one source of electrical power, such that the power conditioners 92 may supply system electrical power to the network adapter 80 via the adapter base 88, as well as to other components coupled to the backplane 78. As shown herein the power input terminals PT are removably connected to the adapter base 88 and are operably connected to the power conditioners 92 through the adapter base 88.

The IO device 74 may include a base 94 also mounted to the support rail 84 or another support structure. The base 94 may be located adjacent to base 82. The base 94 may be operably, physically, and/or electrically connected to the base 82 via multi-contact electrical connectors 96 such that the backplane 78 may power and communicate between the network adapter 80, IO devices 74, the industrial networks N, and the like. FIG. 3 shows the backplane 78 as being external to the IO device 74, but those of ordinary skill in the art will recognize that the backplane 78 circuit or network is physically and electrically constructed within and extends through printed circuit boards and other circuitry located in the bases 88 and bases 94 via the electrical connectors 96.

The IO device 74 may include 10 processing modules (IO modules) 98 (98A, 98B, 98C, 98D). The IO modules 98 may be removably connected to the base 94 in respective mounting slots via electrical connections, such that each of the IO modules 98 may be operatively coupled to the backplane 78. The IO modules 98 may use the backplane 78 to communicate with the network adapter 80, the other 10 (sub) modules 98, 100, and the like. In one embodiment, at least two of the IO modules 98 are identical to each other and operated in parallel with each other to provide a redundancy with respect to each other.

The base 94 may include at least one terminal block 102, which may include cage clamps, spring clamps, screw terminals, or other wiring connectors 104 that are adapted to be connected to field cables or field wiring 110 that are each associated with a field device 106. The field device 106 may be an analog or digital device such as a sensor, flow meter, switch, probe, thermocouple, RTD, encoder, or the like, and the field device 106 may receive input data or transmit output data via the terminal blocks 102.

The network adapter 80 may include independent "adapter" Ethernet switches 112 (112A, 112B), which may be operably connected to, form part of, and establish the backplane 78. Similarly, the IO devices 74 may include independent IO module Ethernet switches 114 (114A, 114B) that may be operably connected to, form part of, and establish the backplane 78. The switches 112 and the switches 114 may be identical but are numbered differently to facilitate description of their operation. The switches 112, 114 may perform a packet switching operation to direct data communication of any suitable backplane network/protocol.

The IO module 76 may be a single-channel IO device that includes one or more removable and replaceable single-channel IO submodules 100. The IO module 76 may include a base 118 adapted for mounting on a support rail 84 or another support structure. The base 118 may include multi-contact electrical connectors 96 to form a portion of the backplanes 78. The IO module 76 may include a terminal block 120 connected to the base 116. The terminal block 120 may include wiring connectors 122 that couple the terminal block 120 to other industrial automation components. The IO module 76 may include Ethernet switches 124 (124A, 124B), each operably coupled to, form part of, and establish the backplane 78.

The IO module 76 may include at least two configurable IO modules 126 (126A, 126B). The configurable IO modules 126 may each be defined by and include separate IO segments or IO submodules 100, which may each be selectively installed on and removable from the base 116. The configurable IO modules 126 may define a group of the IO submodules 100. In this example, the configurable IO modules 126 each include eight, single-channel IO submodules 100, and thus include eight individual IO data channels.

The IO submodules 100 and/or the IO modules 108 may include electronic circuitry to perform a particular type of data input/output (IO) operation, such as a direct current (DC) input, DC output, alternating current (AC) input, AC output, safety input/output, highway addressable remote transducer protocol (HART) input/output, real time data (RTD) and/or thermocouple input and/or output, or other analog or digital input/output for data and signals. Each IO submodules 100 and/or the IO modules 108 may be respectively used for different types of data communication. Furthermore, each IO submodules 100 and/or the IO modules 108 may be associated with a single, dedicated IO data channel operably coupled to a group of one or more wiring connectors 122 of the terminal block 120 (e.g., column of wiring connectors 122). In this way, a field device coupled to the one or more wiring connectors 122 may be associated with a particular IO data channel and may be operably connected to the corresponding IO submodule 100 associated with the same IO data channel. As noted above, the IO submodules 100 and/or the IO modules 108 be selected to be the appropriate IO type (e.g., analog, digital, AC input, AC output, DC input, DC output) as required for the particular field device connected to its associated IO data channel.

As described above, the industrial automation system 46 may transport and process materials that may be classified as hazardous by chemical regulatory agencies and that may be used to produce products worth millions of dollars cumulatively. Consequently, the industrial automation system 46 may be desired to be not only highly reliable but also highly available, such as to satisfy a minimum level of availability for petrochemical applications may of service availability 99.999% percent of the time. To do so, short and long term monitoring operations of the industrial automation system 46 may be used to perform predictive maintenance operations, as well as reactive or other maintenance activities. For example, by monitoring operations of individual components of the industrial automation system 46 alone or in combination with system-wide or unit-wide monitoring operations, maintenance issues may be predicted prior to a component, a unit, and/or the system going offline. Predictive monitoring may improve availability due to, for example, being able to schedule outages of a component, a unit, and/or the system when the monitoring operations has flagged to do a repair or replacement of the portion of the industrial automation system 46. Short and long term monitoring operations of the industrial automation system 46 may be managed by components of the distributed control system 48, for example, by commands to perform specific operations (and resulting data) being propagated throughout the various levels of the distributed control system 48. An example group of components in FIG. 4 may represent a portion of the distributed modular IO system 72 of FIG. 3 associated with the distributed control system 48 but used to control loads at a more local level, such as in the unit 50 or in a nearby unit 50. The distributed modular IO system 72 may be used in combination with power ORing (OR IO) circuitry to predictively maintain power distribution throughout a portion of the industrial automation system 46, thereby reducing a likelihood of an unplanned outage from occurring.

Figure 4:
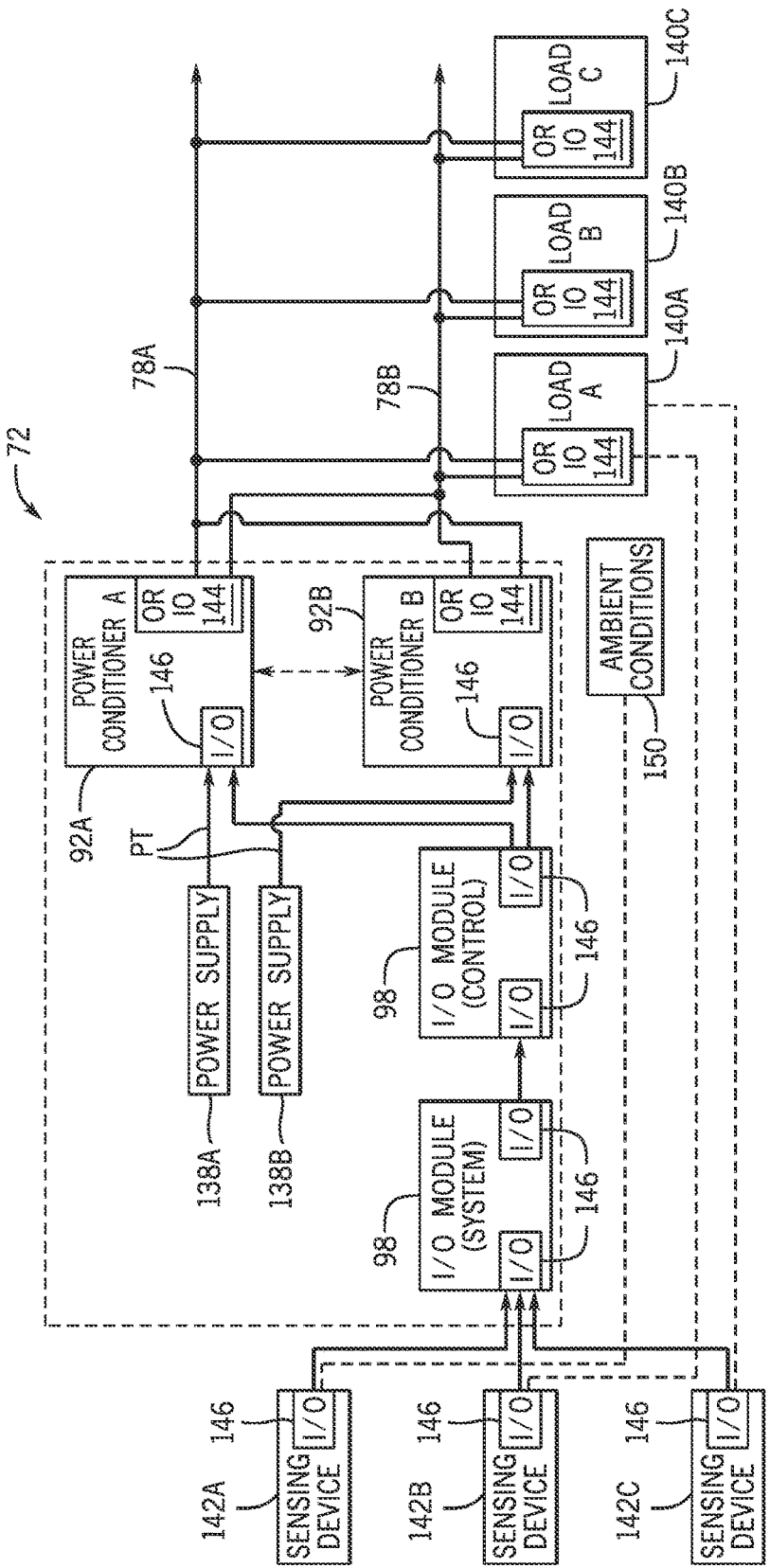
FIG. 4 is a block diagram of the distributed modular IO system of FIG. 3, in accordance with an embodiment.

To elaborate, FIG. 4 is a block diagram of some of the components of the distributed modular IO system 72 of FIG. 3. The power conditioners 92 may couple respectively to power supplies 138 (138A, 138B) and may include power converting circuitry to transform an electrical property of signals received from the power supplies 138 before outputting electrical signals to the backplanes 78. Sometimes the field devices 106 may include loads 140 (140A, 140B, 140C) and sensing devices 142 (142A, 142B, 142C). The loads 140 may additionally or alternatively couple to the IO submodules 100 and/or the IO modules 108 of FIG. 3 via the backplanes 78 at power ORing input/output (OR IO circuitry 144 (e.g., ORing circuits). The OR IO circuitry 144 may include power architectures that provide redundancy through the selection of multiple power sources. The OR IO circuitry 144 may be implemented using a variety of architectures that involve diodes, metal-oxide-semiconductor field-effect transistors (MOSFETs), and the like. Generally, the OR IO circuitry 144 may include multiple power or voltage inputs that may be ORed to a common output. As such, in the event that one input supply becomes unavailable, the OR IO circuitry 144 protects the connected load by providing power via a redundant source.

Additional communication paths may be included between the loads 140 and the power conditioners 92. The OR IO circuitry 144 may automatically switch between backplanes 78 in response to detecting one of power supply providing less than a threshold amount of power or voltage on one of the backplanes 78. The loads 140 may each receive analog or digital signals from the backplane 78A, from the backplane 78B, or both at the OR IO circuitry 144. Signals sent via the backplanes 78 may change individual operation of the loads 140. For example, loads 140 may be a system interface for a downstream IO module coupled to the load 140, and thus may supply power from the power conditioners 92 to the system side of downstream components coupled to the load 140. IO circuitry 146 of the power conditioners 92 may be used to provide feedback, such as via DC signals transmitted between the IO module 98 (control) and the power conditioner 92A, 92B. The feedback may relate to a status of the load 140 and/or of components coupled to the load 140, such as whether one or both connections to the backplane 78 are lost, or other suitable control operation related statuses or data. The IO module 98 (control) or the IO module 98 (system) may be programmed, and operated, as a distributed modular IO system 72 control system, and/or other control circuitry may be included. For ease of description, the IO module 98 (control) is described herein as a primary control system of at least this portion of the distributed modular IO system 72. In some cases, the IO module 98 (system) may coordinate received signals and/or operations of the IO module 98 (control) with larger system operations by communicating with other portions of the distributed modular IO system 72.

The sensing devices 142 may sense operating parameters (e.g., speed, current, output voltage) of the load 140 and/or of ambient conditions 150 that may affect operation of the industrial automation system 46. The sensing devices 142 may acquire the sensed data and may output the sensed data to other control circuitry via input/output (IO) circuitry 146, such as control and processing circuitry described in FIG. 3. The sensed data may be of any suitable format, and thus may include one or more analog electrical signals, digital data signals, pulse-width-modulated data signals, or the like.

After the IO module 98 (system) receives the sensed data from the sensing devices 142, the IO module 98 (system) may transmit the sensed data to the IO module 98 (control). The IO module 98 (control) may analyze the sensed data to determine one or more outputs to send to the loads 140. In some cases, this includes provision of a command to one or more the power conditioners 92 to change how current outputs from the power conditioners 92 coupled to the loads 140 as a redundant pair. The power conditioners 92 may provide current concurrently to the loads 140. As such, to test output currents from one of the power conditioners 92, one of the power conditioners 92 may provide power to the load 140, while the other power conditioner 92 does not. As a result, the loads 140 may connect to the power conditioners 92 and avoid an increased risk of failure if one of the connected power conditioners 92 is unable to provide the appropriate power.

Figure 5:
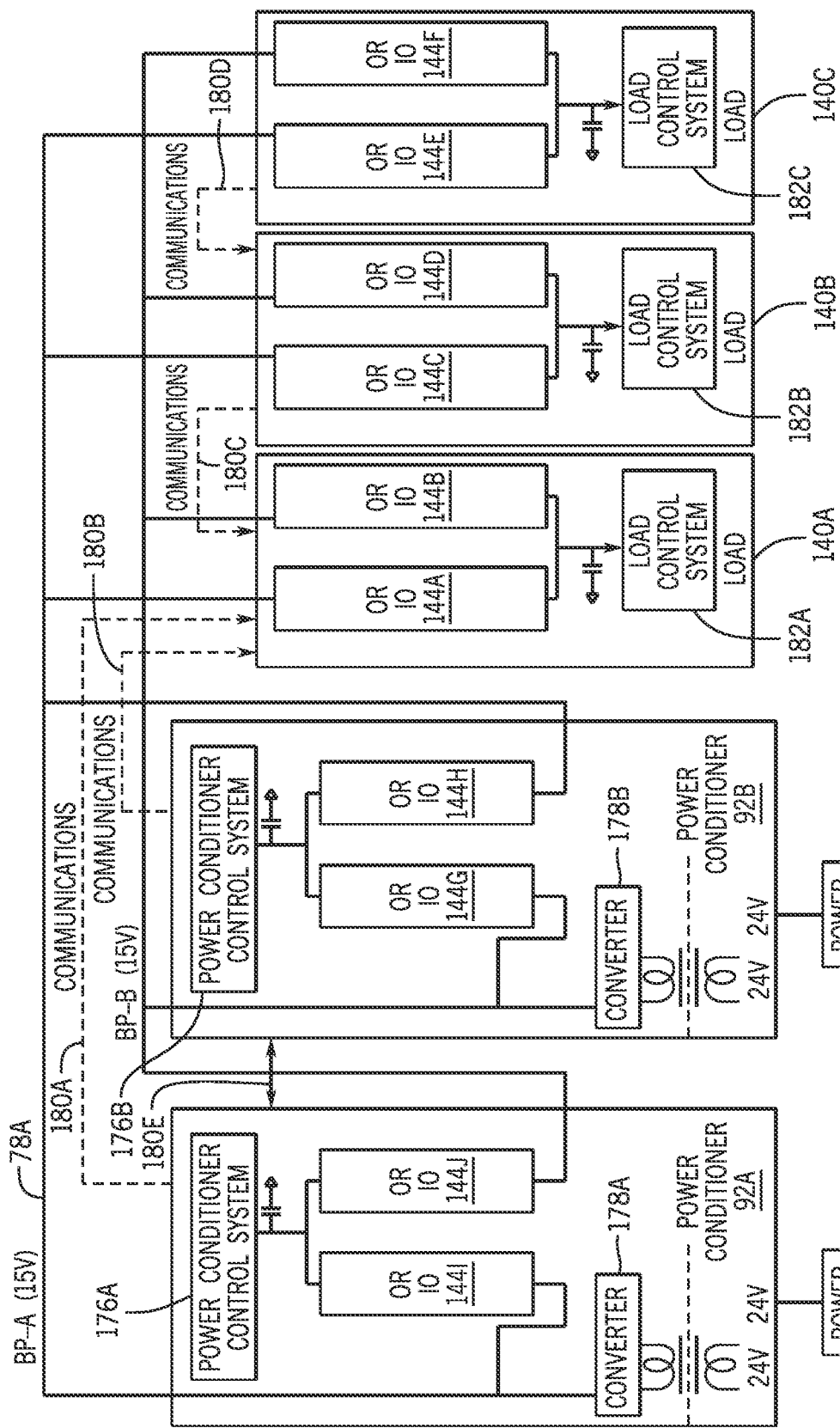
FIG. 5 is a block diagram of a portion of the distributed modular IO system of FIG. 4, in accordance with an embodiment.

With this in mind, the present embodiments described below include output balancing operations and diagnostic operations of the power conditioners 92, which may help to maintain balanced outputs from the redundant power conditioners 92, trigger an intentional imbalance to diagnose whether both of the power conditioners 92 are able to individually supply the load 140 in the event that one goes offline, and detect when one of the power conditioners 92 is offline. Communication pathways with the one or more loads 140 may also enable the power conditioners 92 or other upstream control circuitry to diagnose or monitor one or more loads 140. In the event that one of the backplanes 78 is offline, control circuitry of the power conditioners 92 and/or of the loads 140 may continue to receive power from the other of the backplanes 78, thereby avoiding operational interruptions from losing power and from having to switch on the other backplane 78 to the components. Components, including the control circuitry of the power conditioners 92 and/or of the loads 140, may be coupled to the two or more backplanes 78 using power ORing circuitry (e.g., OR IO circuitry 144). FIG. 5 provides an example of how the two or more backplanes 78 and communication pathways may be inter-connected to the OR IO circuitry 144, the power conditioners 92 and/or of the loads 140.

To elaborate, FIG. 5 is a block diagram of the power conditioners 92, the loads 140, and the OR IO circuitry 144 (144A, 144B, 144C, 144D, 144E, 144F, 144G, 144H, 144I, 144J). The power conditioners 92 may include power conditioner control systems 176 (176A, 176B). The loads 140 may include load control systems 182 (182A, 182B, 182C). The power conditioners 92 may be coupled to the backplanes 78 via the OR IO circuitry 144G-J, such as to power the load power conditioner control systems 176 and the load control systems 182. Each of the loads 140 may couple to each backplane 78 via the OR IO circuitry 144A-F. Although described herein as a two-backplane redundant system, it should be understood that any number of backplanes greater than two may be used to provide additional redundancy to the distributed control system 48.

The power conditioners 92 may include a dual power feed for powering each power conditioner control systems 176A, 176B of the power conditioners 92. Some loads 140 may not include load control systems 182. The backplanes 78A may be fed internally in the power conditioner 92A, and the backplane 78B may come from the partner power conditioner 92B.

Each power conditioner 92 may include one of power converters 178 (178A, 178B) to independently convert input power into output power. Power conditioner control systems 176A, 176B may control respective outputs from the power conditioner 92. For example, the power conditioner control system 176A may instruct a change in output from the power converter 178A, which changes the output from the power conditioner 92A to the backplane 78A. The power converters 178 may be any suitable type of power converter, such an AC-to-DC converter, a DC-to-DC converter, an AC-to-AC converter, a DC-to-AC converter, a diode rectifier, one or more static switches, or the like. The power converter 178 as shown is a DC-to-DC converter that steps down 24V input to 15V output on the backplanes 78. The input power may be received from power supplies 138 coupled upstream from the power conditioner 92. The power supplies 138 may couple to the power conditioner 92 via respective converters to further step down or convert power supplied to the power conditioner 92. These converters may be additional to the power converters 178 included in the power conditioner 92. The power converters 178 may be thought of local power output control that may be tailored to operation of loads 140 coupled to the backplane while a converter coupled external to the power conditioner 92 and downstream of a power supply 138 may prepare supply signals for use by the power conditioner 92. Each power conditioner 92 may be independently coupled to respective power supplies 138 to reduce a likelihood of common cause fault taking downstream system components offline. In some cases, the OR IO circuitry 144 is also included between the power supplies 138 and the power conditioner 92 to provide each power conditioner 92 with concurrent and redundant sources for power. By using the OR IO circuitry 144, the power conditioners 92 may provide redundant and concurrent amounts of power to the loads 140 via the backplane 78.

The OR IO circuitry 144 may include circuitry to power- or supply inputs or outputs to or from the associated device. Indeed, merely paralleling power supplies without additional protection may lead to interrupted operation when a fault occurs, a removal of another device, or the like. Thus, the OR IO circuitry 144 may include devices that enable inrush current and/or fault current protection. Some OR IO circuitry 144 may include semiconductor diodes, and some OR IO circuitry 144 include transistor-based current protections. Generally, the OR IO circuitry 144 internal circuitry prevents backflow of current from a direction of intended delivery (e.g., current transmitted toward the loads 140 from the power conditioner 92). Example OR IO circuitry 144 is contemplated later with reference to at least FIG. 9.

Communication paths 180 may also couple the power conditioner 92 to the loads 140. The loads 140 are shown as interconnected using a daisy chain communication pathway, in which each subsequent load of the loads 140 connects back to the IO module 98 (control) via an adjacent load of the loads 140. It is noted that any suitable communication architecture may be used to interconnect the loads 140 with upstream control circuitry of the distributed control system 48.

Moreover, in some cases, the backplane 78 may include such a structure able to include both power supply paths and the communication paths 180. For instance, a communication path 180A may couple the power conditioner 92A to the load 140A, which may be an adapter module. A communication path 180B may couple the power conditioner 92B to the load 140A. The load 140A may couple to downstream loads 140 via daisy chained communication paths 180. For example, the load 140A is coupled to the load 140B via the communication path 180C, and the load 140B is coupled to the load 140C via the communication path 180D. The loads 140 may periodically send data to the load 140A, acting as the adapter, to enable the load control system 182A to monitor operating conditions and/or statuses of each of the loads 140. The load 140A may use the data from one or more of the loads 140 to diagnose a particular operation as isolated to one load 140 or instead be affecting multiple loads 140. This data and diagnostic capability may enable the upstream control circuitry, like the adapter modules 86, to diagnose a particular operation as isolated to one backplane 78 or instead be affecting multiple backplanes 78. Input currents for the backplanes 78 may also be used during a load share diagnostic operation to determine whether an input current shifts to the proper rail when the power conditioner 92 force a voltage imbalance between backplane 78A and backplane 78B.

Keeping the above descriptions in mind, the power conditioners 92 may themselves operate to balance the output of electrical signals to the backplanes 78. In other words, the power conditioner control system 176A may balance a first power output from the power converter 178A with a second power output from the power converter 178B provided to each of one or more loads 140 (e.g., load components) electrically coupled to the first backplane 78A and the second backplane 78B. Likewise, when one of the power conditioners 92 detects an imbalance between electrical signals provided to the backplanes 78, the power conditioners 92 may sometimes adjust operations of the power converter 178A, the power converter 178B, or both to balance the outputs to make each power converter 178 contribute 50% load current to the loads 140. Imbalance and/or balance conditions may be identified by the power conditioners 92 comparing sensed data to threshold amounts, or expected sensed data values. The balancing operation may involve changing an output voltage from one or more of the power converters 178 to trigger a change in current that results over time in a 50/50 sharing (e.g., equal proportion) of the current used to power the loads 140. It should be understood that other target proportions may be used when balancing or sharing of the load. For example, some systems may use a 60/40 or 40/60 sharing target of power consumption of the loads 140, amongst the power conditioners 92, or any suitable target proportion.

Figure 6:
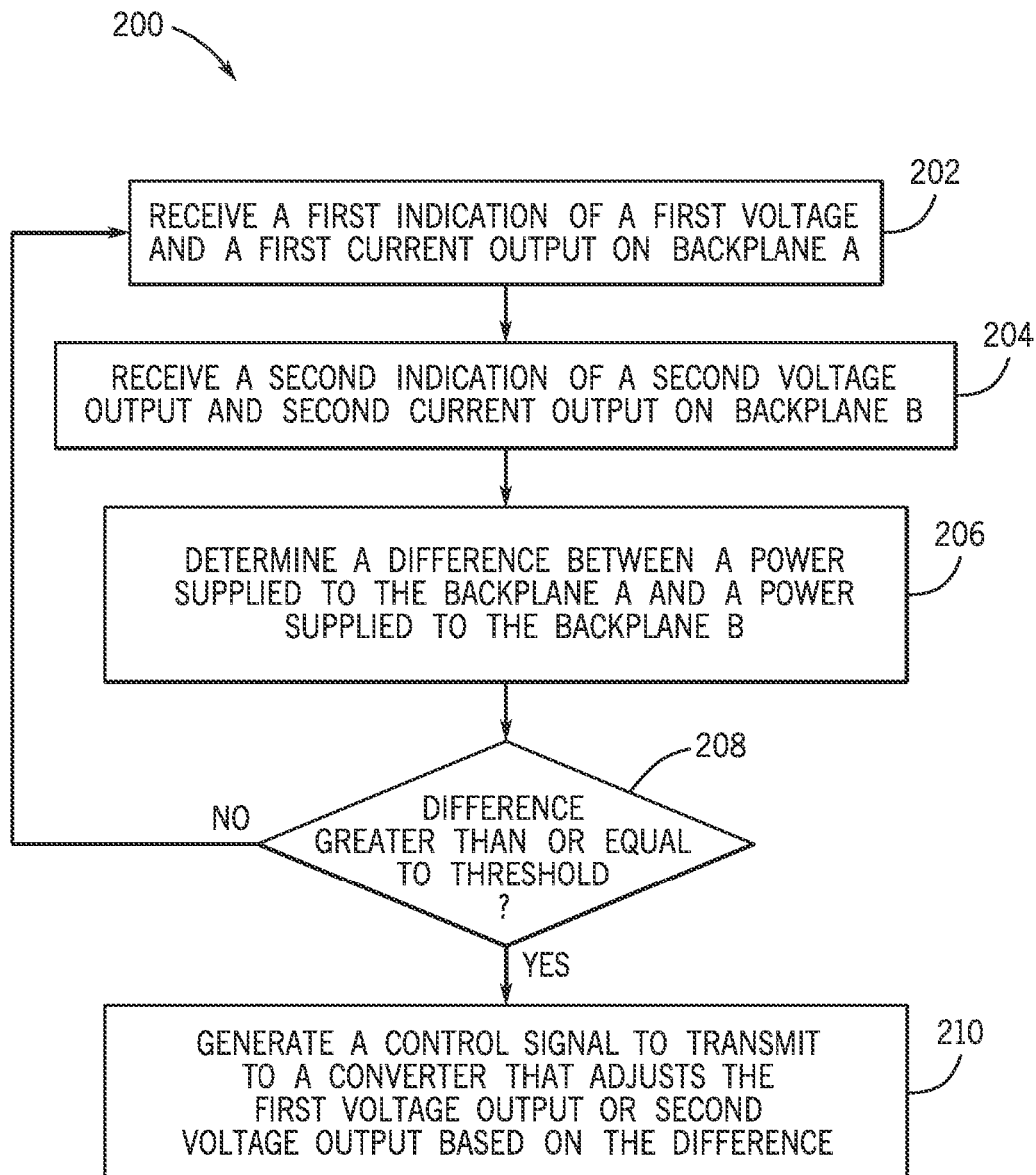
FIG. 6 is a flow diagram of a process for operating a primary power conditioner to maintain control a power output based on an output from a secondary power conditioner, in accordance with an embodiment.

To help explain this balancing operation, FIG. 6 is a flow diagram of a process 200 for operating the primary power conditioner 92 to control a power output based on a power output from the secondary power conditioner 92. The power conditioners 92 may independently monitor and share power output information with each other. When a diagnostic operation is not also running, the power conditioners 92 adjusts the respective backplane voltages linearly, cross comparing with the partner module, looking for their contribution to the total system power to be equal. The process 200 is described as being performed by the primary power conditioner 92, and it should be understood that substantially similar operations are able to be performed by the secondary power conditioner 92, another control system associated with the distributed control system 48 (e.g., IO module 98 (control)), or the like. These operations may be performed in response to processing circuitry of the power conditioner control system 176A executing instructions stored in a tangible, non-transitory, computer-readable medium, such as a memory of power conditioner control system 176A, or another suitable memory. Moreover, the operations of the process 200 are shown in a particular order; however, some of the operations may be performed in a different order than what is presented or omitted altogether. Certain voltage and current values are described herein, but it should be understood that these are example values and example ranges, which may be adjusted for specific systems and implementations.

At block 202, the power conditioner 92A may receive a first indication of a first voltage and a first current output that may be present on the backplane 78A. The power conditioner 92A may include sensing devices that measure the first voltage and the first current output of the backplane 78A and provide the power conditioner 92A with the sensed data.

At block 204, the power conditioner 92A may receive a second indication of a second voltage and a second current output on the backplane 78B from the power conditioner 92B. The power conditioner 92B may include sensing devices that measure the second voltage and the second current output of the backplane 78B. The power conditioner 92B may transmit the sensed data to the power conditioner 92A via the communication paths 180E.

At block 206, the power conditioner 92A may determine a difference between a power supplied to the backplane 78A and a power supplied to the backplane 78B. The power conditioner 92A may determine the power supplied based on the received indications of voltage and currents from the sensing devices and the power conditioner 92B. In some cases, the power conditioner 92B may determine the power supplied to the backplane 78B and transmit an indication of the power to the power conditioner 92A.

At block 208, the power conditioner 92A may determine whether the difference determined at block 206 is greater than or equal to a threshold value. The threshold value may indicate a suitable amount of deviation or imbalance between the amounts of power supplied to the different backplanes 78. For example, a 2V difference between the outputs may be suitable while a 10V different may be unsuitable. Any difference may be used based on the particular application.

When the difference is not greater than the threshold, the power conditioner 92A may deem the power supplied as balanced and may determine to not make an adjustment. Thus, at block 202, the power conditioner 92A may receive a new indication of voltages and currents supplied via the backplanes 78.

When the difference is greater than the threshold, the power conditioner 92A may deem the power supplied as imbalanced and make an adjustment to try to rebalance the outputs. Thus, at block 210, the power conditioner 92A may generate a control signal to cause the power converter 178A to adjust the first voltage output and/or to cause the power converter 178B to adjust the second voltage output based on the difference. The power conditioner 92A may trigger an adjustment proportional to the difference exceeding the threshold value by a larger amount. The adjustment made may span multiple days, months, or even years, as to not introduce transient signal spikes into the distributed control system 48. For example, the overall balancing adjustment may be relatively slow when compared to a voltage regulation control loop used by converter 178, and smaller balancing power output targets may be used to shift operation toward balanced outputs incrementally over time. The voltage regulation control loop may control voltage output from the power converter 178 according to a frequency in the micro seconds per cycle. In some cases, power used by the loads 140 may dynamic, so it may be more efficient to maintain average power over a relatively long period of time (e.g., hours, days, months, years). By the time the incremental adjustment is applied over the timespan, the outputs from the power conditioner 92 may be balanced with each power conditioner 92 supplying equal amounts of average power.

Having multiple power conditioners 92 also may enable diagnostic testing to detect presence and location of a fault, such as a fault affecting one or both of the backplanes 78. In some cases, the power conditioners 92 may receive sensing data (e.g., sensor data) from the OR IO circuitry 144 of the loads 140 to further diagnose locations of faults or operations of the backplanes 78. For example, a load 140 receiving a lower amount of current than an expected amount of current may indicate a partial fault or some other misoperation to one or more of the power conditioners 92, which may transmit an indication to upstream control circuitry to further debug or alert an operator to the issue.

Figure 7:
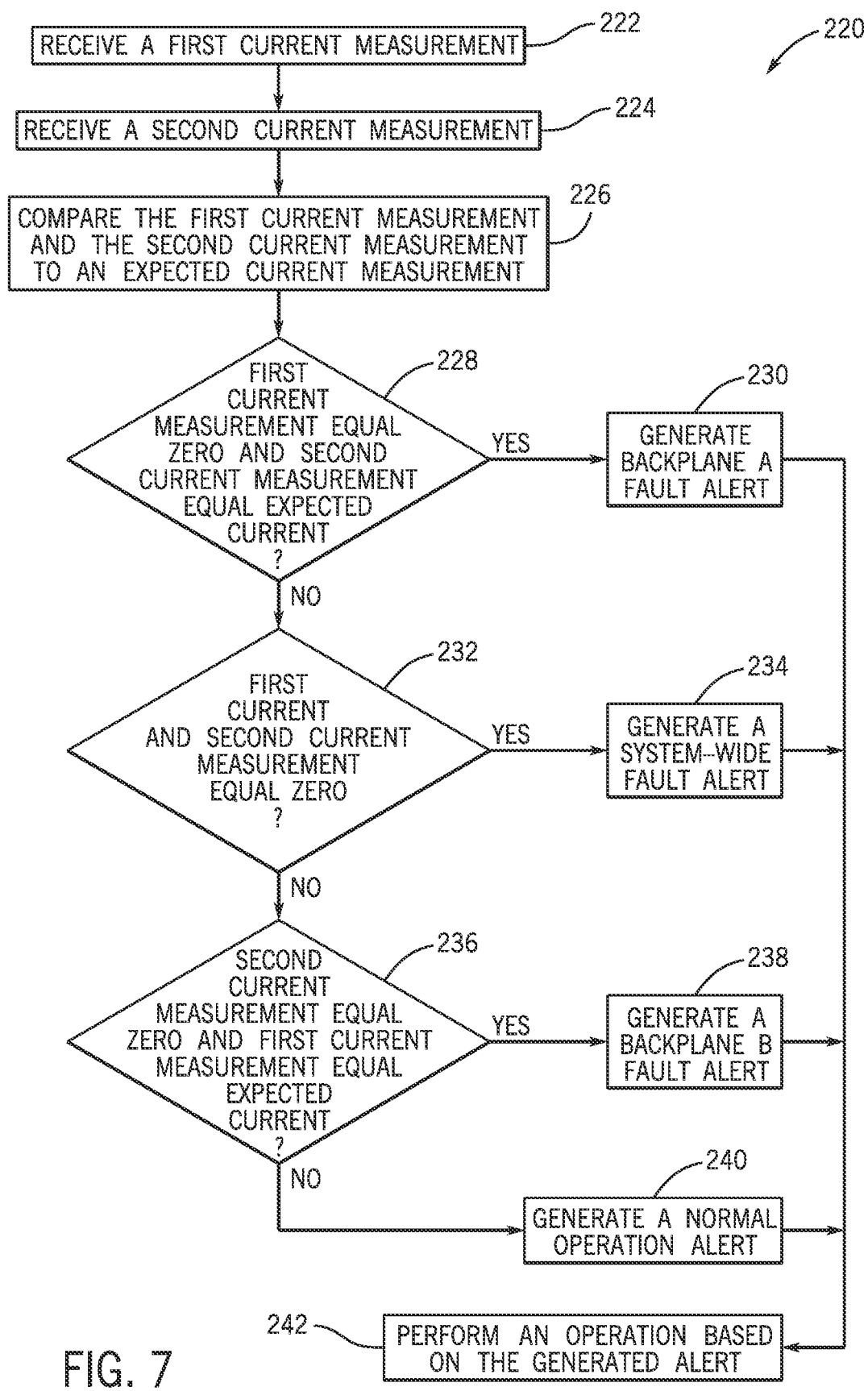
FIG. 7 is a flow diagram of a process for operating a power conditioner to detect operational statuses of one or more backplanes, in accordance with an embodiment.

To elaborate on fault detection operations, FIG. 7 is a flow diagram of a process 220 for operating the power conditioner 92A to detect operational statuses of the respective backplanes 78. The process 220 is described as being performed by the power conditioner 92A (e.g., power conditioner control system 176A of the power conditioner 92A), and it should be understood that substantially similar operations are able to be performed by the power conditioner 92B, another control system associated with the distributed control system 48 (e.g., IO module 98 (control)), or the like. These operations may be performed in response to processing circuitry of the power conditioner control system 176A executing instructions stored in a tangible, non-transitory, computer-readable medium, such as a memory of the power conditioner control system 176A, or another suitable memory. Moreover, the operations of the process 220 are shown in a particular order; however, some of the operations may be performed in a different order than what is presented or omitted altogether. Certain voltage and current values are described herein, but it should be understood that these are example values and example ranges, which may be adjusted for specific systems and implementations.

At block 222, the power conditioner 92A may receive a first current measurement from a first sensing device. The first sensing device may be disposed at an input to the backplane 78A, at one of the loads 140, or at another downstream device coupled to the backplane 78A. The first current measurement may indicate an output current on the backplane 78A. At block 224, the power conditioner 92A may receive a second current measurement from the power conditioner 92B. The second current measurement may indicate an output current on the backplane 78B. The power conditioner 92B may receive the second current measurement from a second sensing device. The second sensing device may be disposed at an input to the backplane 78B, at one of the loads 140, or at another downstream device coupled to the backplane 78B.

At block 226, the power conditioner 92A may compare the first current measurement and the second current measurement, respectively, to an expected current measurement. The expected current measurement may indicate an amount of current expected during normal operation of each of the backplanes 78.

At block 228, the power conditioner 92A may determine whether the first current measurement equals zero or is within a threshold range from zero and whether the second current measurement equals the expected current or is within a threshold range from the expected current. When the first current measurement equals zero and the second current measurement equals the expected current, at block 230, the power conditioner 92A may generate a backplane A fault alert that indicates that backplane 78A may be or is experiencing a fault. For example, the power conditioner 92A may transmit a control signal via the distributed control system 48 to trigger an alert be generated for an operator, to trigger an updated to an HMI, to perform a shutdown or startup operation, or the like. Otherwise, the power conditioner 92A continues to, at block 232, determine whether the first current measurement and the second current measurement equal zero or is within a threshold range from zero.

When the first current measurement and the second current measurement equal zero, at block 234, the power conditioner 92A may generate a system-wide fault alert that indicates that multiple backplanes 78 may be or are experiencing a fault. Otherwise, the power conditioner 92A continues to, at block 236, determine whether the second current measurement equals zero or is within a threshold range from zero and whether the first current measurement equals the expected current or is within a threshold range from the expected current. When the second current measurement equals zero and the first current measurement equals the expected current, at block 238, the power conditioner 92A may generate a backplane B fault alert that indicates that backplane 78B may be or is experiencing a fault. When none of the conditions at block 228, block 232, or block 236 are met, the power conditioner 92A may, at block 240, generate a normal operation alert that indicates that the backplanes 78 are operating as expected.

At block 242, the power conditioner 92A may perform an operation based on the generated alert. For example, the power conditioner 92A may transmit a control signal via the distributed control system 48 to trigger an alert be generated for an operator, to trigger an updated to an HMI, to perform a shutdown or startup operation, or the like.

In some cases, at blocks 228, 232, and 236, the power conditioner 92A may determine, in addition to checking whether the first current measurement and/or the second current measurement equal zero, whether the first current measurement and/or the second current measurement equal are within a threshold range from zero and/or are outside a threshold range from an expected current. The threshold range from the expected current may be set greater than, equal to, or less than the threshold range from the expected current used to verify correct operation of the backplanes 78. Different threshold levels than the ones described herein may be used to trigger different types of alerts. Comparing, at blocks 228, 232, and/or 236, the first current measurement to zero, to a threshold range from zero, and/or to a threshold range from an expected current may enable the power conditioner 92A to determine whether the first current measurement indicates a fault condition on the backplane A corresponding to a fault in the current sense circuitry (e.g., when the first current measurement equals zero) or an over voltage or misoperation of the current sense circuitry (e.g., when the first current measurement is outside the first threshold range from the expected current). Comparing, at blocks 228, 232, and/or 236, the second current measurement to zero, to a threshold range from zero, and/or to a threshold range from an expected current may enable the power conditioner 92A to determine whether the second current measurement indicates a fault condition on the backplane B corresponding to a fault in the current sense circuitry (e.g., when the second current measurement equals zero) or an over voltage or misoperation of the current sense circuitry (e.g., when the second current measurement is outside the first threshold range from the expected current). The power conditioner 92A may reuse the results from the determination at block 228 at the determination operations of blocks 232, 236, which may improve efficiency of the determinations by not repeating the same comparison. Similar to determinations of block 228, the power conditioner 92A may determine now whether the second current measurement equals zero, is within a threshold range from zero, or is outside a first threshold range from the expected current. Similar operations may be performed by the power conditioner 92B.

In some cases, separate determinations are performed for both determining whether the first current measurement equals zero and determining whether the first current is outside the first threshold range, and the separate determinations may result in separate alerts being generated. Using separate determinations may enable the power conditioner 92 to generate different alerts that particularly indicate whether it was a fault in the current sense circuitry, an over voltage of the current sense circuitry, or a misoperation of the current sense circuitry that triggered the generation of the alert.

Having multiple power conditioner 92 may enable diagnostic testing to detect whether one or both of the power conditioners 92 are capable of supplying 100% of current to the loads 140, such as to predict before one of the power conditioners 92 goes offline whether the other power conditioner 92 is capable of supplying the loads 140. Without testing load supplying capabilities of both of the power conditioners 92, when it comes time to call on either power conditioner 92 to supply the full load current, the power conditioner 92 may be unable to output the full load current. By testing using operations described in FIG. 8, one of the power conditioners 92 may adjust (e.g., increase, decrease) its output current to enable the operational verification of the other power conditioner 92 output without turning off or disconnecting either power conditioners 92. This may improve operation of industrial automation systems 46 by enabling predictive maintenance operations to occur without introducing additional switching transients to do so. To do so, the power conditioner control system 176A may cause a first output power and a second output power provided to the loads 140 to be imbalanced in response to determining that the first difference is less than the threshold amount. Thus, the power conditioner control system 176A may incrementally shift the supply of the load 140 more to the power conditioner 92B for testing until reaching the threshold amount of difference.

Figure 8:
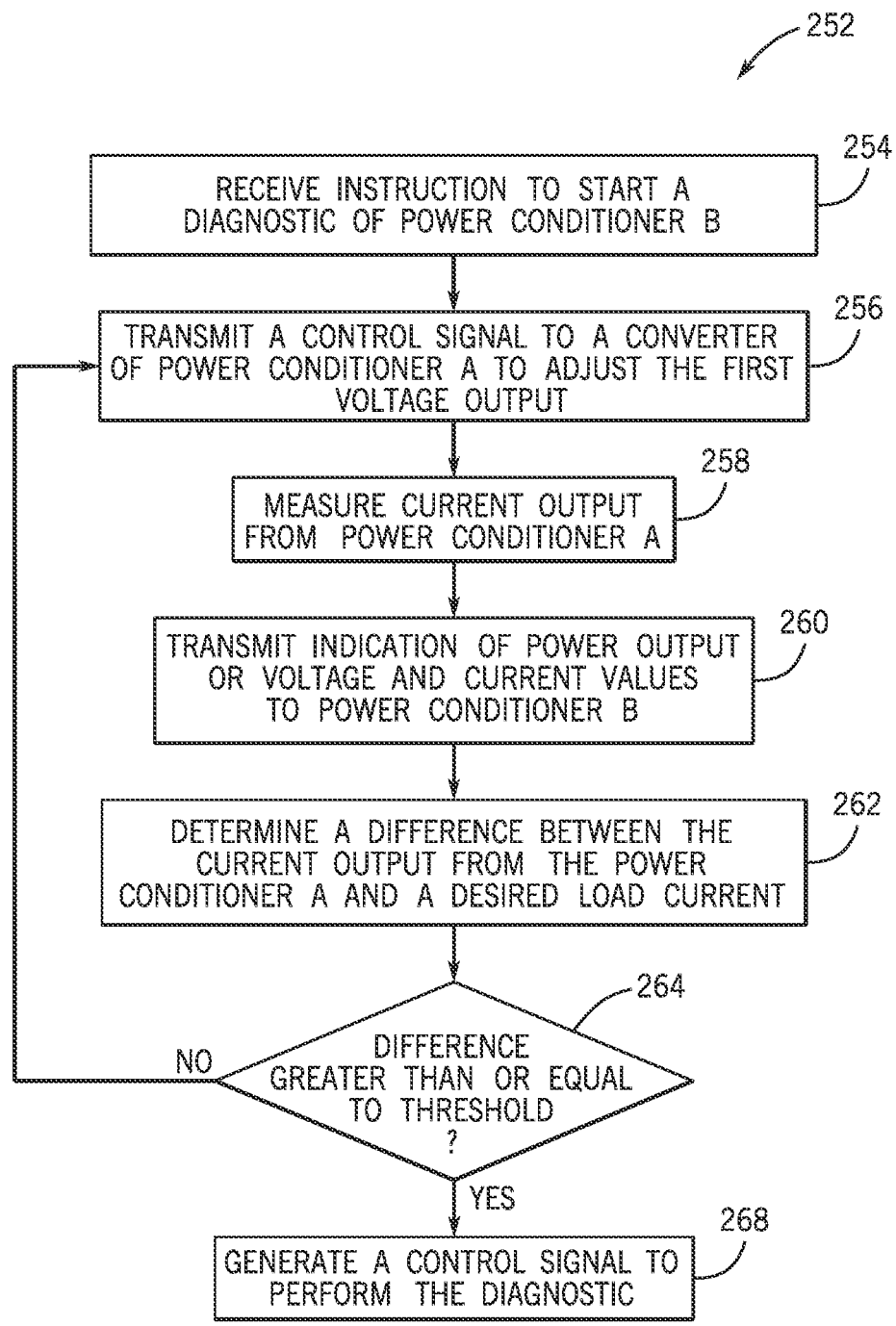
FIG. 8 is a flow diagram of a process for operating a power conditioner to perform a diagnostic operation, in accordance with an embodiment.

To elaborate, FIG. 8 is a flow diagram of a process 252 for operating the power conditioners 92 to perform a diagnostic operation. The power conditioners 92 may independently monitor and share power output information with each other when operating outside of performing the diagnostic operation. At some time, the power conditioners 92 may start a diagnostic in which one power conditioner 92 raises the output voltage (e.g., by adjusting a digital-to-analog converter (DAC) voltage from the microprocessor of the power converter 178) while monitoring an output current or voltage. Using feedback from on-board current and voltage measurements from sensing devices (e.g., measurements taken by one or more sensing devices disposed such as to measure signals at points 1-7 in FIG. 9) as well as that of the partner power conditioner 92, the distributed modular IO system 72 settles in a position where one power conditioner 92 is totally handling the loads 140 until the diagnostic is terminated.

The process 252 is described as being performed by the power conditioner 92A and it should be understood that substantially similar operations are able to be performed by either power conditioner 92, another control system associated with the distributed control system 48 (e.g., IO module 98 (control)), or the like. These operations may be performed in response to processing circuitry of the power conditioner control system 176A executing instructions stored in a tangible, non-transitory, computer-readable medium, such as a memory of the power conditioner control system 176A, or another suitable memory. Moreover, the operations of the process 252 are shown in a particular order; however, some of the operations may be performed in a different order than what is presented or omitted altogether. Certain voltage and current values are described herein, but it should be understood that these are example values and example ranges, which may be adjusted for specific systems and implementations.

At block 254, the power conditioner 92A may receive an instruction to start a diagnostic operation on the power conditioner 92B. An IO module 98 may generate the instruction in response to a condition being met to trigger the diagnostic operation, in response to user input, in response to a duration of time passing, or the like. The diagnostic operation may involve verifying that the power conditioner 92B can generate enough current to support the loads 140 in the event that the power conditioner 92A goes offline. Other diagnostic operations may benefit from load shifting between the backplanes 78 and thus may additionally or alternatively be initiated with this process as well. The instruction may indicate a request to verify that the power converter 178B is capable of supplying the one or more loads 140 and the power conditioner control systems 176 with a target current value while the first current on the first backplane 78A and the second current on the second backplane 78B are imbalanced, as may occur when the first current on the first backplane 78A is negligibly small or 0 amps [A] and the second current on the second backplane 78B increases in value to compensate for current draw of the load components (e.g., one or more loads 140 and the power conditioner control systems 176).

In response to the instruction, at block 256, the power conditioner 92A may generate a control signal to transmit to the power converter 178A that adjusts the first voltage output in response to the control signal. The power converter 178A may increase the first voltage output in response to the control signal to increase the proportion of the loads 140 powered by the power conditioner 92A.

At block 258, the power conditioner 92A may measure a current output from the power converter 178A to the backplane 78A. At block 260, the power conditioner 92A may transmit an indication of the power output via the backplane 78A and/or indications of a voltage and current output via the backplane 78A to the power conditioner 92B. The voltage output to the backplane 78A may match the voltage adjusted to in block 256, and thus the power conditioner 92A may not repeat sensing of the voltage output. At block 262, the power conditioner 92A may determine a difference between the current output from the power conditioner 92A and a desired load current to be output by the power conditioner 92A during the diagnostic.

At block 264, the power conditioner 92A may determine whether the difference is greater than or equal to a threshold value. The threshold value may correspond to a current difference to maintain while the diagnostic test is being performed. For example, the threshold value may equal a value corresponding to the power conditioner 92B wholly powering the load 140 and the power conditioner 92A not powering the load 140. Until the difference is greater than or equal to the threshold value, and thus until the power conditioner 92A has passed the load 140 onto the power conditioner 92B, the power conditioner 92A may continue, at block 256, to generate a control signal to transmit to the power converter 178A, which in turn continues to reduce the current output on the backplane 78A in response to the control signal.

In this way, the power conditioner control system 176A of the power conditioner 92A may first determine that the difference at block 264 is less than the threshold, repeat instructing the power converter 178A to increase the output voltage, resulting in a further increased output voltage to the backplane 78A, and repeat the difference determination operations of blocks 262, 264 to determine whether that most recent adjustment was sufficient to increase the output current from the power conditioner 92A to the desired load current. When one or more additional increases are made to the output voltage and the output current to the backplane 78A is a threshold value, the backplane 78B may take over supplying current to the loads 140 and the process 252 may continue to block 268.

When the difference is greater than or equal to the threshold value, the power conditioner 92A may, at block 268, generate a control signal to perform the diagnostic or to instruct the power conditioner 92B to perform the diagnostic. The diagnostic operation may involve testing a current output from the power conditioner 92B to the backplane 78B to verify that the power conditioner 92B is able to supply a desired amount of power to a load. At conclusion of the diagnostic operation, the power conditioner 92A may generate a control signal to instruct the power converter 178A to return to the higher level of current output, such that the loads 140 on the backplanes 78 are equally supplied current from both power conditioners 92. In some cases, the power conditioner control system 176A of the power conditioner 92A may generate and transmit an alert to notify the distributed control system 48 that the power conditioner 92B is capable of operating the power converter 178B to output the target current output used to supply the loads 140 with 100% of a load current.

Figure 9:
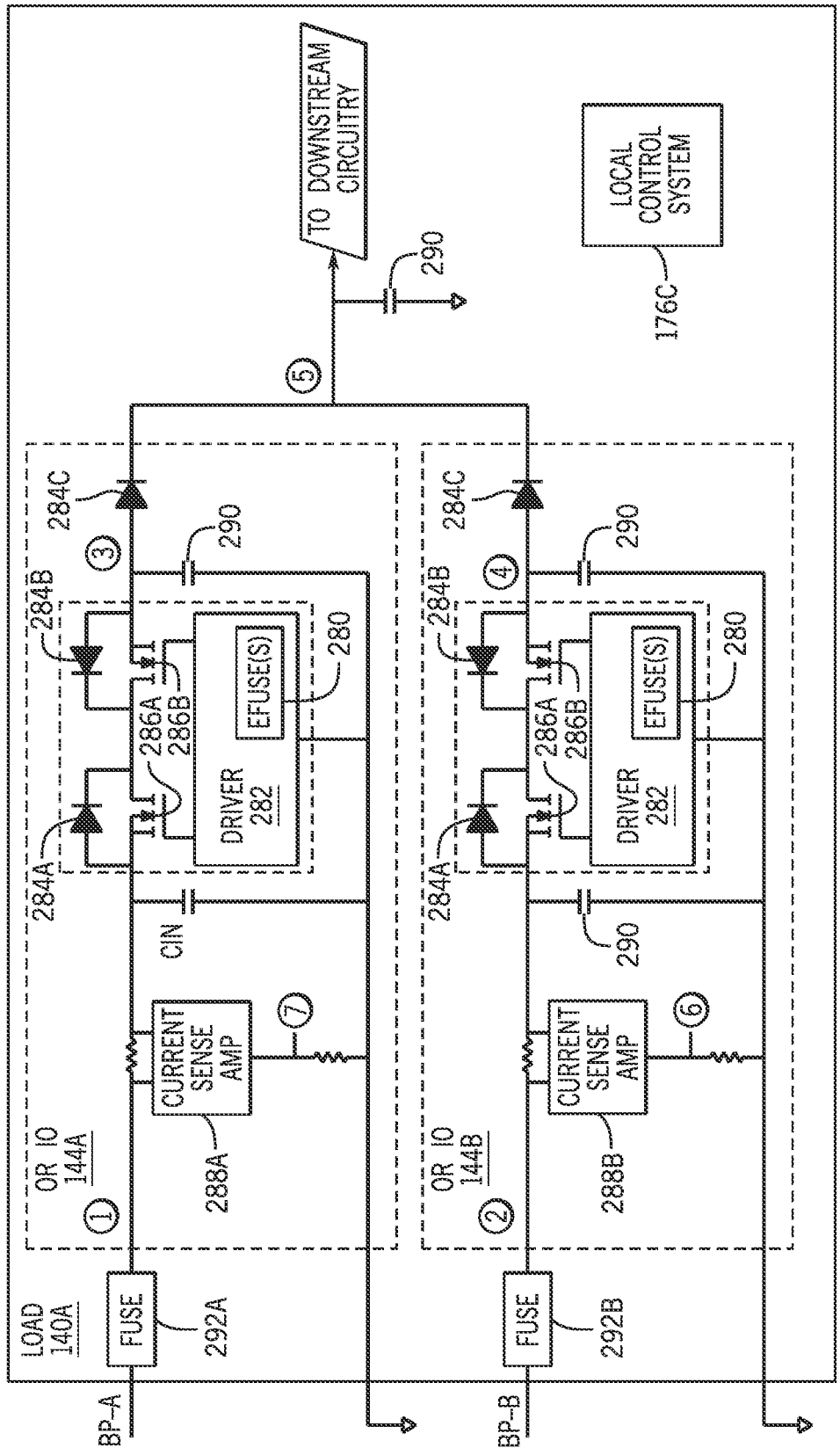
FIG. 9 is a block diagram of power ORing circuitry (OR IO) of a load of FIG. 4, in accordance with an embodiment.

In some cases, OR IO circuitry 144 is included in the loads 140A as well as in the power conditioners 92. FIG. 9 shows example circuitry of the OR IO circuitry 144 that may be used in one or more of the loads 140, one or more of the power conditioners 92, or in other components coupled to the one or more backplanes 78. It is noted that FIG. 9 is an example of components and more or less components may be included in the OR IO circuitry 144.

To elaborate, FIG. 9 is a block diagram of the OR IO circuitry 144A, 144B of the load 140A. This OR IO circuitry 144 is described as being part of the load 140 but could be part of any power conditioner 92, any of the loads 140, or any other component connected to either of the backplanes 78.

The OR IO circuitry 144A, 144B may include electronic fuse(s) 280 (e.g., "efuse"), drivers 282, one or more semiconductor devices, such as MOSFETs or diodes 284, switches 286, and current sensing amplifiers 288. By including the OR IO circuitry 144A, 144B between the supplying backplanes 78 and downstream components of the load 140A, a likelihood of the load 140 losing power and going offline is reduced. For example, the load 140A receives power when both the backplanes 78 are on, when just the backplane 78A is on, and when just the backplane 78B is on. The load 140A may only lose supply from the backplanes 78 when both backplanes 78 are off. Currents may be prevented from back transmitting via the backplanes 78 based at least in part on the diodes 284 relative biasing (e.g., diodes 284 being forward biased diodes block currents from transmitting from an anode-side to a cathode-side). Capacitors 290 may be included to help smooth a switching off or on of the output from the OR IO circuitry 144A, 144B. Fuses 292 (292A, 292B) may couple between the OR IO circuitry 144 and the backplane 78 input to the load 140A to provide additional overcurrent protection. The fuses 292 and the electronic fuses 280 may provide redundant protection, such as redundant over-current protection, such that is one misoperates the other automatically protects. The electronic fuses 280 and the diodes 284 may provide redundancy in the power ORing in case one of the diodes 284 misoperates.

The electronic fuse 280 may include one or more fuses on a local computing circuit. This may permit dynamic, real-time reprogramming of the computing circuit based on the positioning, and repositioning over time, of the one or more fuses. By using the electronic fuse 280, the operation of the driver 282 may be changed while the load 140A is in operation. For example, the driver 282 may perform undervoltage and/or overvoltage protection operations, overcurrent protection operations, and/or soft start control operations based on the state of the fuses of the electronic fuse 280.

Undervoltage and/or overvoltage protection operations may involve the electronic fuse 280 changing state in response to a sensed voltage condition and, responsive to the change of state, opening the switches 286. The switches 286 may be any suitable type of switch, such as a metal-oxide-semiconductor field-effect transistor (MOSFET) switch.

Different thresholds may be used to detect the undervoltage condition and the overvoltage condition. When the sensed voltage is greater than the threshold value corresponding to the overvoltage condition, the switches 286 may be opened. When the sensed voltage is less than the threshold value corresponding to the undervoltage condition, the switches 286 may be opened. Opening the switches 286 may stop current from transmitting to the downstream devices of the load 140. Overcurrent protection operations may involve fuses 292 and/or the electronic fuse 280 changing state in response to a sensed current condition exceeding a threshold amount of current and, responsive to the change of state, opening the switches 286. Soft start control operations may enable steady switching operations according to a soft start profile to slowly and carefully bring components of the load 140 online while minimizing an introduction of switching transients into the supplied power. Soft start control operations may be used in combination with many different types of devices, such as silicon carbide circuit breakers or control circuitry, which may be structurally advantageous to use for soft start control operations from the incorporate of the solid state switching technologies.

In some systems, the power conditioner 92A may increase the voltage output to shift the load wholly on the power conditioner 92A. Similar operations apply for diagnosing full load capabilities of the power conditioner 92B. That is, either of the power conditioners 92 may diagnose whether its circuitry is capable of supplying the whole load with current in the event that the other power conditioner 92 were to go offline. Indeed, either of the power converters 178 may raise its output to a current and/or voltage set point and then verify that the power has shifted to the corresponding power converters 92. Either set point may correspond to a maximum rated output voltage and/or maximum rated output current for the specific power converter 178. For example, the power converter 178A may increase the power output to the backplane 78A to a rated power output level (e.g., maximum power output) and consequently cause the loads 140 to shift to being wholly supplied by the power conditioner 92A via the backplane 78A.

Figure 10:
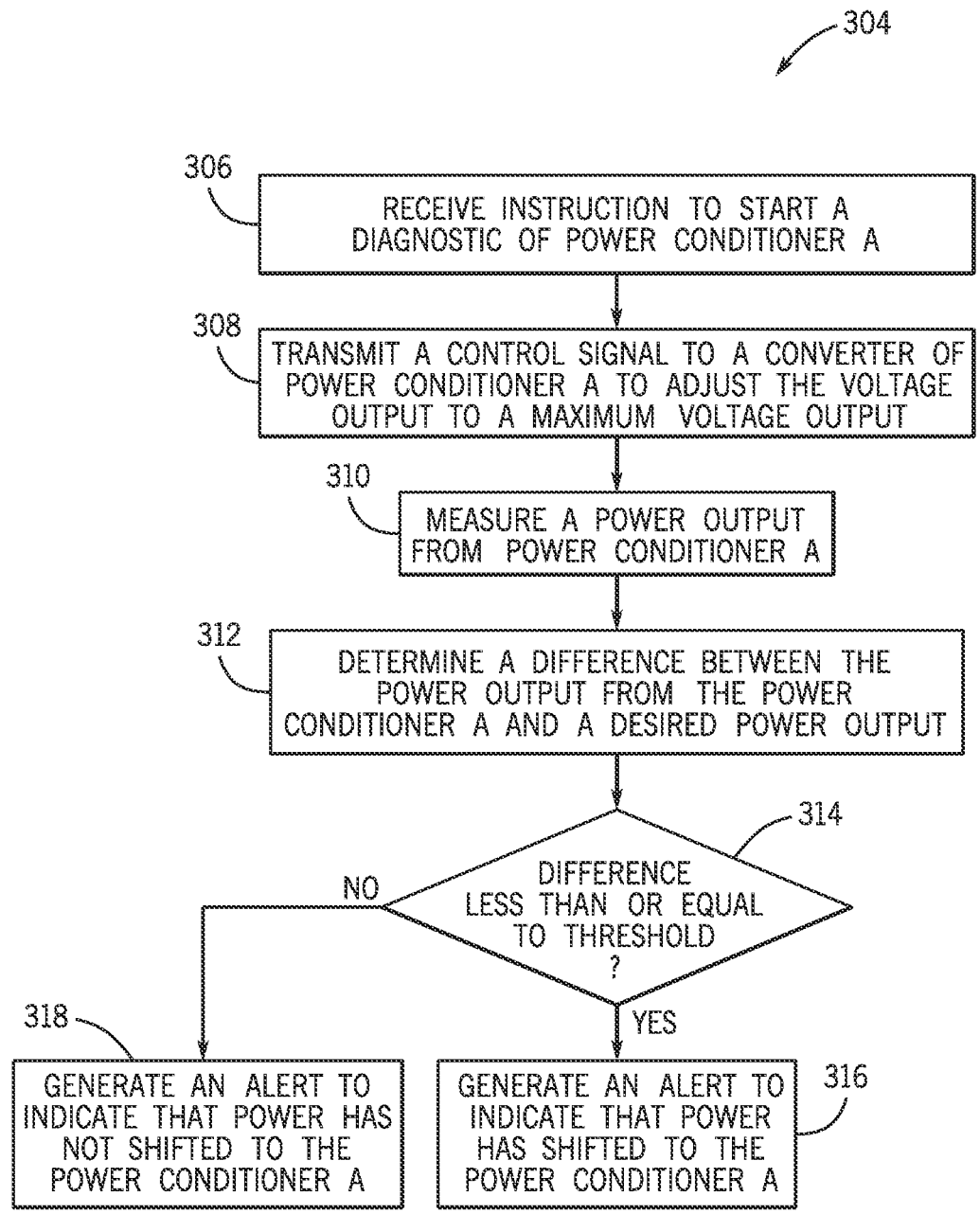
FIG. 10 is a flow diagram of another example process for operating a power conditioner to perform a diagnostic operation, in accordance with an embodiment.

To elaborate, FIG. 10 is a flow diagram of a process 304 for operating the power conditioners 92 to perform a diagnostic operation. The power conditioners 92 may independently monitor and share power output information with each other when operating outside of performing the diagnostic operation. At some time, the power conditioners 92 may start a diagnostic in which one power conditioner 92 raises the output voltage (e.g., by adjusting a DAC voltage from a microprocessor of the power converter 178) to a maximum output voltage level for the corresponding power converter 178 to shift the loads 140 to that power conditioner 92. If the difference between the power output from that power conditioner 92 and a target power output used to supply the loads 140 is met, then that power conditioner 92 may be deemed to be capable of wholly supplying the loads 140. It is noted that although process 304 is described relative to a target power output, in some cases, operation of the power conditioners 92 may be verified relative to a target current output, a target voltage output, or the like to confirm that each power conditioner 92 is able to supply the full load without the other.

The process 304 is described as being performed by the power conditioner 92A and it should be understood that substantially similar operations are able to be performed by either power conditioner 92, another control system associated with the distributed control system 48 (e.g., IO module 98 (control)), or the like. These operations may be performed in response to processing circuitry of the power conditioner control system 176A executing instructions stored in a tangible, non-transitory, computer-readable medium, such as a memory of the power conditioner control system 176A, or another suitable memory. Moreover, the operations of the process 304 are shown in a particular order; however, some of the operations may be performed in a different order than what is presented or omitted altogether. Certain voltage values, current values and/or power values are described herein, but it should be understood that these are example values and example ranges, which may be adjusted for specific systems and implementations.

At block 306, the power conditioner 92A may receive an instruction to start a diagnostic operation on itself. An IO module 98 may generate the instruction in response to a condition being met to trigger the diagnostic operation, in response to user input, in response to a duration of time passing, or the like. The diagnostic operation may involve verifying that the power conditioner 92A can generate enough current to support the loads 140 in the event that the power conditioner 92B goes offline.

In response to the instruction, at block 308, the power conditioner 92A may generate and transmit a control signal to the power converter 178A that adjusts the first voltage output in response to the control signal, such as to a maximum available voltage output level. The power converter 178A may increase the first voltage output in response to the control signal to increase the proportion of the loads 140 powered by the power conditioner 92A.

At block 310, the power conditioner 92A may measure a power output from the power converter 178A to the backplane 78A. To do so, the voltage output to the backplane 78A may match the voltage adjusted to in block 308, and thus the power conditioner 92A may not repeat sensing of the voltage output and instead measure the output current to the backplane 78A. At block 312, the power conditioner 92A may determine a difference between the power output from the power conditioner 92A and a desired power output to be output by the power conditioner 92A during the diagnostic. The desired power output may correspond to a power output to be used to suitably supply the loads 140 without contribution from the power conditioner 92B.

At block 314, the power conditioner 92A may determine whether the difference is less than or equal to a threshold value. The threshold value may correspond to a power difference tolerance between the desired power output to be maintained to shift the load 140 to the backplane 78A while the diagnostic test is being performed and the actual power output. For example, it may be permitted to not have an exact match between the desired power output and the actual power output, and the value of the threshold may represent a tolerated range of values. If the difference is less than or equal to the threshold, at block 316, the power conditioner 92A may generate an alert to indicate that the power has shifted to the power conditioner 92A, and thus that the power conditioners 92A is capable of supplying the loads 140 if the power conditioner 92B were to go offline. However, if the difference is not less than or equal to the threshold (e.g., is greater than the threshold), at block 316, the power conditioner 92A may generate an alert to indicate that the power has not shifted to the power conditioner 92A, and thus that the power conditioners 92A is incapable of supplying the loads 140 if the power conditioner 92B were to go offline.

Either of the alerts generated at block 316 or at block 318 may be transmitted to control circuitry, such as the adapter modules 86, upstream control circuitry, circuitry of the distributed control system 48, or the like. Indeed, either alert generated may cause another measurement to be performed and/or an updating of a graphic on an HMI to convey successful completion of the diagnostic operation and whether or not the power conditioner 92 under test is able to supply the loads 140 alone. The alerts may trigger generation of an alarm, such as an audible alert or a graphic alarm on the HMI. For example, the alert generated at block 318 may trigger an alarm to draw attention of an operator to the determination that the power conditioner 92A was unable to wholly supply the loads 140. As another example, the alert generated may trigger a subsequent sensing operation to further debug or verify suitable operation of the backplanes 78, the power converters 178, and/or the power conditioners 92. The alert being generated may cause the power conditioner 92A to receive one or more current values from one or more current sensors associated with one or more load components, such as by the alert being associated with a control signal being generated to trigger a sensing operation.

The loads 140 may sometimes include a load control system 182, like is shown in FIG. 5 and FIG. 9. For example, when the load 140 is an IO module (e.g., one of the IO (sub)modules 76, 98, 100, 108, 126), that IO module may include a load control system 182. The load control system 182 may include processing and memory circuitry to provide local diagnostic monitoring and processing capabilities to the IO module. For example, the load control system 182A may communicate with sensing devices that measure voltage, current, temperature, pressure, or other operating parameters at points 1-7 marked on FIG. 9.

The load 140A may include sensing devices (e.g., one or more sensors) disposed at one or more locations within the load 140 to take measurements at points 1-7. In this way, the load 140A may use OR IO circuitry 144A that includes one or more integrated sensors. When being installed within the industrial automation system 46, the OR IO circuitry 144A may be included in the load 140A such that the sensors need not be separately installed to sense electrical parameters of at least the points 1-7. The integrated sensors of the IO circuitry 144A may be included within a same physical housing of at least the IO circuitry 144A.

The load control system 182A may receive voltage data indicative of local voltage feedback corresponding to the points 1-5. The load control system 182A may process the voltage data to track voltages experienced at the each of the corresponding portions of the load 140 being measured at points 1-5. The load control system 182A may receive current data from the current sensing amplifier 288A, 288B indicative of local current supply corresponding to the points 6 and 7. The load control system 182A may process the current data to track currents on both of the backplanes 78. Some or all of the same sensing data may also be sent to control circuitry, such as adapter modules 86 and/or another suitable control component. The control circuitry may sense a fault condition occurring or about to occur based on sensing data received from one or more of the loads 140 (e.g., more than one IO module) even when each respective load 140 (e.g., respective IO module) may be unable to detect the pattern of the fault in its own locally sensed data. The load control system 182A may generate control signals for the drivers 282 and/or the electronic fuses 280 to implement control operations instructed by upstream control circuitry (e.g., power conditioner control systems 176A, 176B, IO module 98 (control), other components of the distributed control system 48), to implement local control operations based on the sensed data of any of the points 1-7, or the like.

It is noted that some of the components described herein may be implemented using wireless communication technology, wired communication technology, or a combination of the two. For example, the IO circuitry 146 may be outfitted for wireless communication in addition to or instead of wired communication. Thus, the sensed data may sometimes be transmitted via wireless and/or radio frequency signals, even if power signals are transmitted via hardwired connections.

Technical effects of the systems and methods described herein include an industrial automation system that uses a shared power backplane to coordinate load sharing between two power IO modules (e.g., power conditioners) and to perform periodic diagnostics to check redundancy of power IO modules. The industrial automation system may use power ORing circuitry (OR IO circuitry) at loads and IO modules within a distributed control system to improve redundancy and availability of an industrial automation system while reducing occurrences of transients associated with typical redundant power supply operations and switching. By using these power ORing systems and methods and the IO modules described herein, the industrial automation system operation may improve by being able to switch between primary and secondary power supplies without abrupt or sudden switching operations, which can introduce switching transients and reduce life of industrial automation components. Diagnostic capabilities from the concurrent and redundant power supplies may further improve industrial automation system operation by making it more likely that a misoperation may be detected early and making it easier to detect locations of faults using internal sensing circuitry of the power ORing circuitry. Furthermore, IO modules with a universal IO configuration are also described as being used with the power ORing circuitry, and may provide additional benefits from being able to be used with the diagnostic operations to provide further monitoring capabilities, such as providing a distributed control system that may be less complex to maintain.

While the present disclosure may be susceptible to various modifications and alternative forms, specific embodiments have been shown by way of example in the drawings and have been described in detail herein. However, it should be understood that the present disclosure is not intended to be limited to the particular forms disclosed. Rather, the present disclosure is intended to cover all modifications, equivalents, and alternatives falling within the spirit and scope of the present disclosure as defined by the following appended claims.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. A system, comprising:
   a first power converter configured to supply a first output power;
   a second power converter configured to supply a second output power
   a first backplane electrically coupled to the first power converter and the second power converter;
   a second backplane electrically coupled to the first power converter and the second power converter;
   one or more load components each comprising a first ORing circuit and a second ORing circuit electrically coupled to the first backplane and the second backplane, respectively, and configured to operate based on the first output power, the second output power, or both; and
   a control system communicatively coupled to the first power converter, the second power converter, and one or more sensors, wherein the control system is configured to:
   receive a first indication of the first output power from the one or more sensors;
   receive a second indication of the second output power from the one or more sensors;
   determine a difference between the first output power and the second output power;
   determine that the difference is greater than or equal to a threshold amount of power; and
   in response to the difference being greater than or equal to the threshold amount of power, send one or more control signals to the first power converter, the second power converter, or both to adjust the first output power, the second output power, or both based on the difference.

2. The system of claim 1, wherein the control system is configured to detect the difference based on sensor data acquired by one or more sensors.

3. The system of claim 2, wherein the one or more sensors are integrated within the first ORing circuit of a plurality of ORing circuits.

4. The system of claim 3, wherein the first ORing circuit comprises a semiconductor device configured to prevent backflow current from being received from the second ORing circuit of the plurality of ORing circuits.

5. The system of claim 4, wherein the first ORing circuit comprises a fuse configured to provide a redundant protection for the backflow current in addition to the semiconductor device.

6. The system of claim 4, wherein the semiconductor device comprises a diode or a metal-oxide-semiconductor field-effect transistor (MOSFET).

7. The system of claim 3, wherein the plurality of ORing circuits is configured to couple to the control system.

8. The system of claim 1, wherein the control system is configured to balance the first output power and the second output power provided to each of the one or more load components.

9. The system of claim 1, wherein each of the one or more load components are configured to couple to a base, and wherein the first backplane and the second backplane are constructed within and extend through the base to electrically couple to each of the one or more load components.

10. A system, comprising:
    a first power converter configured to supply a first power output;
    a second power converter supplying a second power output;
    a first backplane electrically coupled to the first power converter and the second power converter;
    a second backplane electrically coupled to the first power converter and the second power converter; and
    a control system electrically coupled to the first power converter and the second power converter, wherein the control system is configured to balance the first power output and the second power output provided to each of one or more load components, wherein the one or more load components each comprise a first ORing circuit and a second ORing circuit electrically coupled to the first backplane and the second backplane, respectively.

11. The system of claim 10, wherein the control system is configured to balance the first power output and the second power output at least in part by:
    receiving a first indication of the first output power;
    receiving a second indication of the second output power;
    determining a difference between the first output power and the second output power;

determining that the difference is greater than or equal to a threshold amount of power; and in response to the difference being greater than or equal to the threshold amount of power, sending one or more control signals to the first power converter, the second power converter, or both to adjust the first output power, the second output power, or both based on the difference.

12. The system of claim 10, wherein the one or more load components are configured to couple to the first backplane using a first plurality of power ORing circuits comprising the first ORing circuit and to couple to the second backplane using a second plurality of power ORing circuits comprising the second ORing circuit.

13. The system of claim 10, wherein each of the one or more load components are coupled using a daisy chain connection.

14. The system of claim 13, wherein the control system is configured to receive status information from a first load component of the one or more load components after the status information is transmitted via at least a second load component of the one or more load components using the daisy chain connection.

15. The system of claim 10, wherein the control system is electrically coupled to the first backplane using a third power ORing circuit, and wherein the control system is electrically coupled to the second backplane using a fourth power ORing circuit.

16. A method, comprising:
receiving, via a power conditioner control system configured to electrically couple to a first backplane and a second backplane, a first indication of a first output power from one or more sensors, wherein a first power converter is configured to supply the first output power, and wherein each of one or more load components comprises a first ORing circuit and a second ORing circuit electrically coupled to the first backplane and the second backplane, respectively;
receiving, via the power conditioner control system, a second indication of a second output power from the one or more sensors, wherein a second power converter is configured to supply the second output power;
determining, via the power conditioner control system, a difference between the first output power and the second output power;

determining, via the power conditioner control system, that the difference is greater than or equal to a threshold amount of power; and
in response to the difference being greater than or equal to the threshold amount of power, sending, via the power conditioner control system, one or more control signals to the first power converter, the second power converter, or both to adjust the first output power, the second output power, or both based on the difference.

17. The method of claim 16, comprising detecting, via the power conditioner control system, the difference based on sensor data acquired by one or more sensors integrated within the first ORing circuit of a plurality of ORing circuits coupled to the first backplane.

18. The method of claim 16, comprising:
receiving, via the power conditioner control system, an indication of a first output current of the first backplane;
receiving, via the power conditioner control system, an indication of a second output current of the second backplane;
comparing, via the power conditioner control system, the first output current and the second output current to an expected output current; and
transmitting, via the power conditioner control system, an alert based on the comparison.

19. The method of claim 18, wherein transmitting the alert comprises:
when the first output current equals zero and the second output current equals the expected output current, transmitting, via the power conditioner control system, the alert indicating a first backplane fault;
when the first output current and the second output current equals zero, transmitting, via the power conditioner control system, the alert indicating a system-wide fault; and
when the second output current equals zero and the first output current equals the expected output current, transmitting, via the power conditioner control system, the alert indicating a second backplane fault.

20. The method of claim 18, wherein sending the one or more control signals comprises sending the one or more control signals to the first power converter to adjust the first output power based on the difference, wherein the second output power is configured to automatically adjust in response to the first output power being adjusted.

* * * * *